United States Patent
Motz et al.

(10) Patent No.: US 9,027,662 B2
(45) Date of Patent: May 12, 2015

(54) APPARATUS FOR INFILL EXTRACTION AND COLLECTION

(71) Applicant: Technology Licensing Corp.

(72) Inventors: Joseph E Motz, Cincinnati, OH (US); David P Motz, Cincinnati, OH (US)

(73) Assignee: Technology Licensing Corp., Newtown, OH (US)

( * ) Notice: Subject to any disclaimer, the term of this patent is extended or adjusted under 35 U.S.C. 154(b) by 116 days.

(21) Appl. No.: 13/834,168

(22) Filed: Mar. 15, 2013

(65) Prior Publication Data

US 2013/0202396 A1     Aug. 8, 2013

Related U.S. Application Data

(63) Continuation of application No. PCT/US2012/033829, filed on Apr. 16, 2012, which is a continuation of application No. 13/206,723, filed on Aug. 10, 2011.

(60) Provisional application No. 61/606,808, filed on Mar. 5, 2012, provisional application No. 61/475,508, filed on Apr. 14, 2011.

(51) Int. Cl.
*E01C 13/08*    (2006.01)
*A01B 45/04*    (2006.01)
(Continued)

(52) U.S. Cl.
CPC .............. *B65H 18/10* (2013.01); *A01G 1/004* (2013.01); *B60P 1/00* (2013.01); *E01C 13/08* (2013.01); *E01C 19/522* (2013.01); *E01C 23/00* (2013.01)

(58) Field of Classification Search
USPC ............. 56/202; 172/15–21, 133, 32; 134/10, 134/22.12, 22.18, 37, 104.2, 122 R, 134/124–137, 151, 165; 15/345, 346, 405
See application file for complete search history.

(56) References Cited

U.S. PATENT DOCUMENTS 3,257,785 A    6/1966    Rimes
4,907,403 A *  3/1990    Jones .............................. 56/202
(Continued)

FOREIGN PATENT DOCUMENTS

JP      3266913      11/1991
WO    2010094576       8/2010
WO    2012142610      10/2012

OTHER PUBLICATIONS

United States Patent and Trademark Office, International Search Report and Written Opinion for PCT/US2012/33829, Sep. 21, 2012.
(Continued)

*Primary Examiner* — Robert Pezzuto
(74) *Attorney, Agent, or Firm* — Wood, Herron & Evans, LLP

(57) ABSTRACT

An apparatus for extracting and collecting particulate infill from an infilled artificial turf field. A vehicle has a first forward end and a second rearward end. An infill extractor is located at the first end of the vehicle and adapted to extract infill from a strip of infilled athletic turf. Extracted infill falls into a bottom section of the infill extractor. An infill mover is secured to the vehicle and adapted to move the extracted infill from the bottom section of the infill extractor toward the second end of the vehicle. An infill collector is connected to the second end of the vehicle and operable to cooperate with the infill mover to collect the moved infill. The infill collector includes a frame that is laterally movable relative to the vehicle from an operative "in use" position to a stowed position.

20 Claims, 19 Drawing Sheets

(51) Int. Cl.
*B65H 18/10* (2006.01)
*A01G 1/00* (2006.01)
*B60P 1/00* (2006.01)
*E01C 19/52* (2006.01)
*E01C 23/00* (2006.01)

(56) References Cited

U.S. PATENT DOCUMENTS

| | | | |
|---|---|---|---|
| 5,070,687 A * | 12/1991 | Schweigert | 56/202 |
| 5,307,880 A | 5/1994 | Woerner | |
| 5,902,414 A | 5/1999 | Keal et al. | |
| 5,951,780 A * | 9/1999 | Pettigrew | 134/6 |
| 6,655,469 B1 | 12/2003 | Davis | |
| 6,769,495 B1 * | 8/2004 | Van Loen | 172/19 |
| 8,388,764 B2 * | 3/2013 | Jonsson | 134/122 R |
| 8,464,801 B2 * | 6/2013 | Bearden | 172/20 |
| 8,771,434 B2 * | 7/2014 | Mitchell | 134/122 R |
| 2003/0037388 A1 | 2/2003 | Feyma et al. | |
| 2008/0282663 A1 | 11/2008 | Dunning et al. | |
| 2010/0001115 A1 | 1/2010 | Jonsson | |
| 2010/0319510 A1 | 12/2010 | Bearden | |
| 2012/0006930 A1 | 1/2012 | Mitchell | |
| 2012/0017939 A1 | 1/2012 | Davis et al. | |
| 2012/0096661 A1 | 4/2012 | Pizano et al. | |
| 2013/0017023 A1 | 1/2013 | Nicholls et al. | |

OTHER PUBLICATIONS

International Bureau of WIPO, Notification Concerning Transmittal of International Preliminary Report on Patentability (Chapter I of the Patent Cooperation Treaty) for PCT/US2012/033829, Oct. 24, 2013.
United States Patent and Trademark Office, Notice of Transmittal of and International Search Report and Written Opinion for PCT/US2014/25514, Nov. 7, 2014.

* cited by examiner

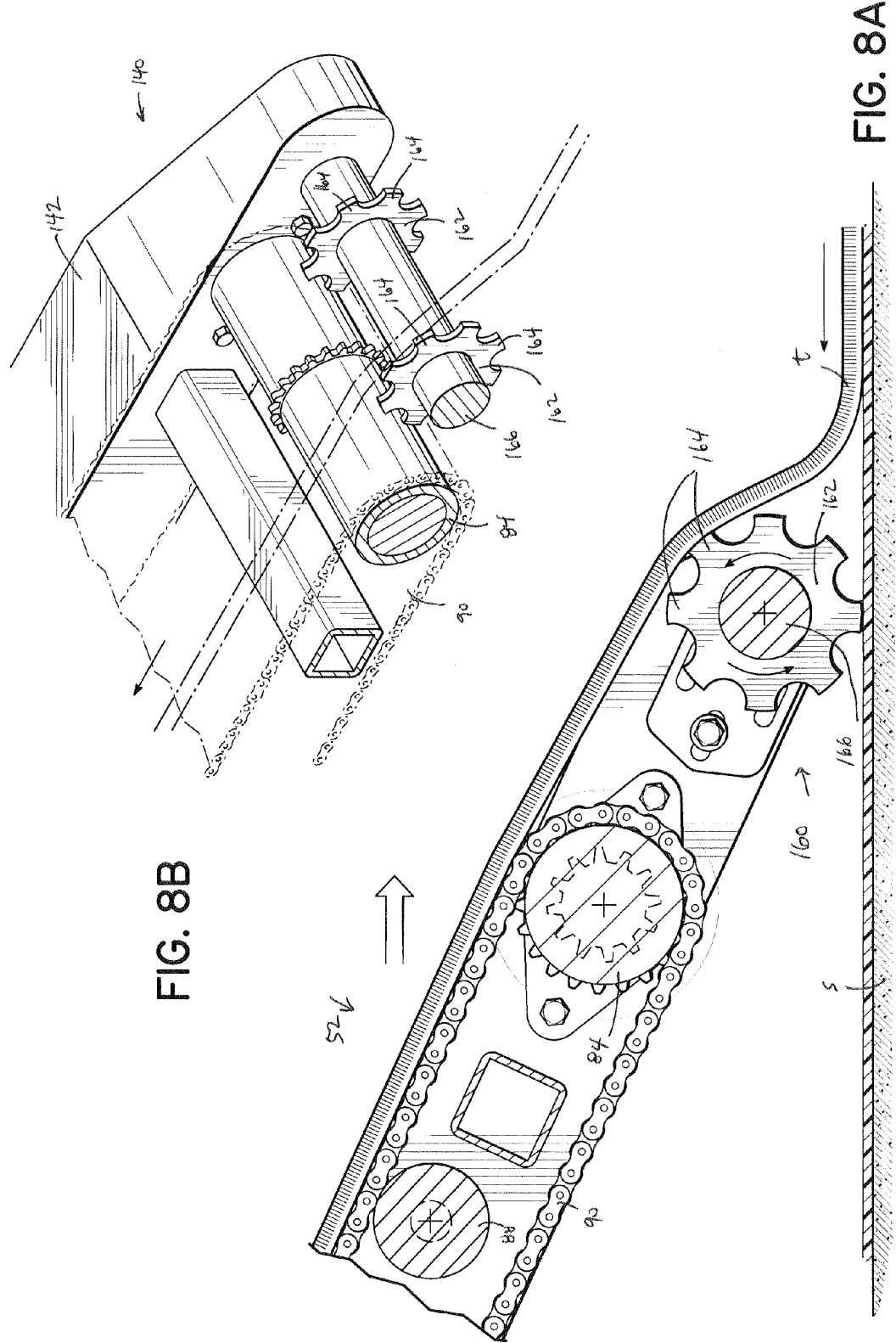

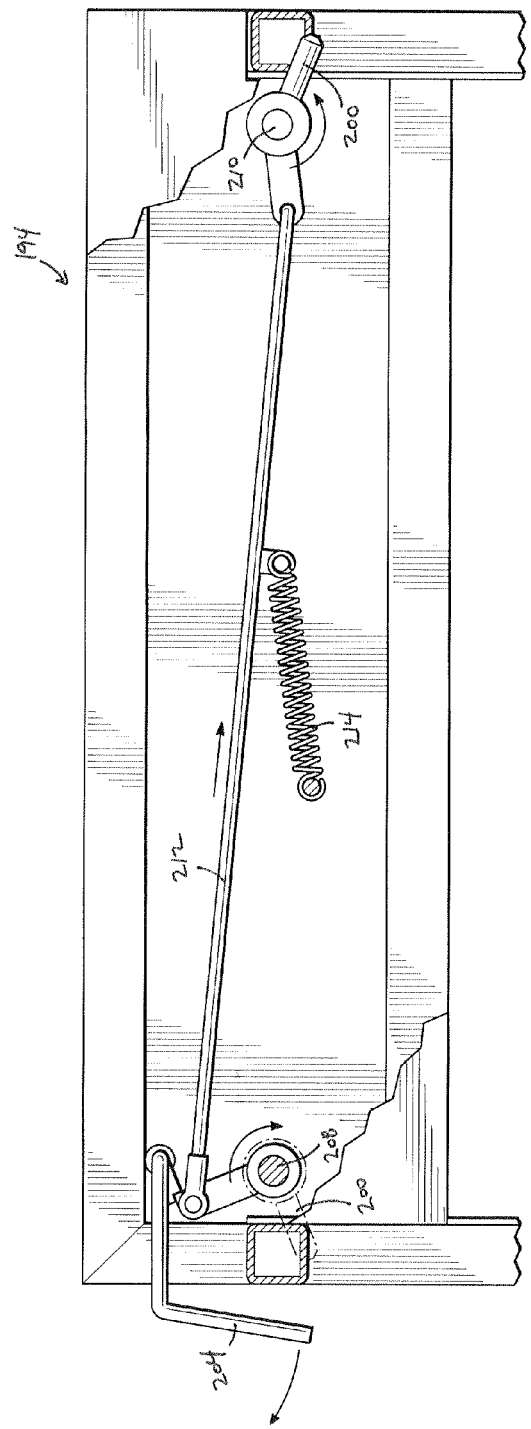
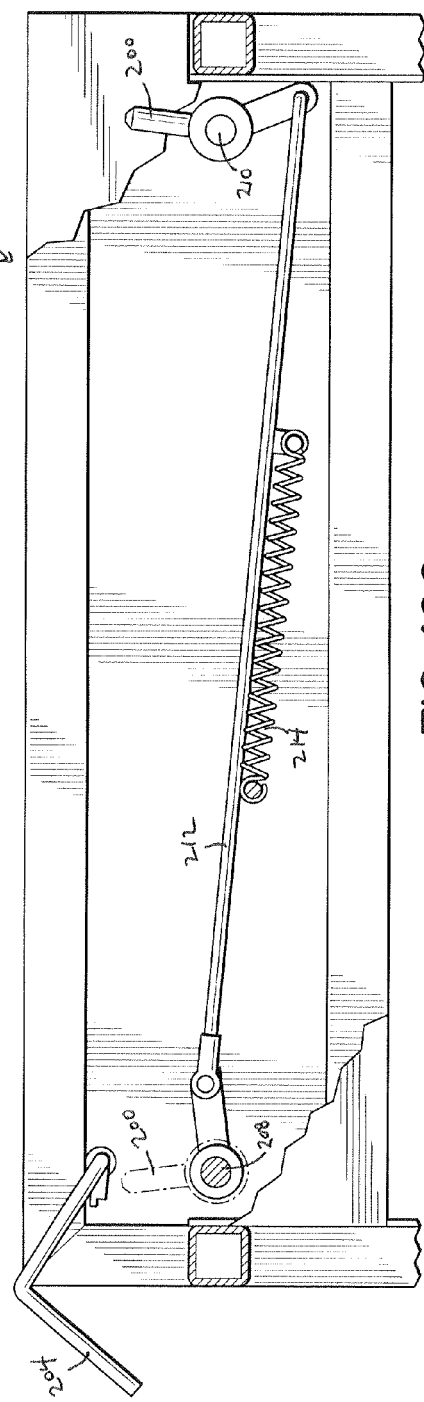
FIG. 10B
FIG. 10C

APPARATUS FOR INFILL EXTRACTION AND COLLECTION

FIELD OF THE INVENTION

The present invention relates generally to infilled artificial turf athletic fields, and more particularly, to an apparatus that facilitates the extraction and collection of particulate infill from an artificial turf field after the useful life of the field.

SUMMARY OF THE INVENTION

Applicant's currently pending PCT Patent Application No. PCT/US2012/033829, entitled "Apparatus and Methods for Facilitating the Removal of Existing Turf and Installing New Turf" describes some of applicant's relatively recent innovations with respect to removing an infilled artificial turf from an athletic field, after the useful life of the field. The present application represents additional advances in this same technology, with those additional advances focused primarily on infill extracting and infill collecting.

More specifically, the present invention further advances the process of extracting particulate infill from a strip of infilled athletic turf via the following structural changes to the vehicle mounted extractor: a modified leading edge of the conveyor which feeds the strip to the extractor housing, a tension roller within the extractor housing at the top of the conveyor, a single rotatable beater, or agitator, for beating the infill out of the strip, a housing structure with internal members which coact with the single agitator to guide the strip around the agitator for about 270 degrees of its circumference and then direct the strip downwardly in front of the vehicle, and one pulling roller located downstream of the agitator and adapted to pull the strip through the housing.

According to one aspect of the invention, this housing structure includes strippers which interleave with the agitator, near the location where the strip is directed downwardly and away from the agitator. The strippers assure that the strip does not continue to move around the agitator. Also, the housing includes a hinged lid to which the tension roller is mounted, as well as the internal members which guide the strip around the initial part of the path around the agitator.

According to another aspect of the invention, the tension roller cooperates with upper side of the top end of the feed conveyor, to hold the strip in compression as it enters the housing. Moreover, the pulling roller cooperates with the lower side of the top end of the feed conveyor, to also hold the strip in compression as it is pulled around the agitator and is then directed forwardly and down to the surface of the field in front of the vehicle. Preferably, the tension roller, the top end of the feed conveyor, and the pulling roller are substantially vertically aligned.

This structure for the extractor housing efficiently and effectively removes the particulate infill from the strip as it traverses along a prescribed path, with the extracted infill collected in the bottom of the housing, as taught in the above-mentioned PCT application.

According to still another aspect of the invention, the feed conveyor includes an endless loop belt, preferably a chain, that is internally supported along its length by a plurality of internal rollers, and also includes two external support rollers. The front lower end of the feed conveyor has a plurality of spaced angled fingers which initially direct the strip of infilled turf upward toward the housing. The spacings between these fingers allows particulate from the athletic field surface to fall back to the surface, rather than becoming inadvertently trapped onto the top surface of the feed conveyor and then directed into the housing.

According to an even further aspect of the invention, a feed conveyor includes a lower endless belt and an upper endless belt. A strip of turf is directed between the two toward the housing. Advantageously, the two endless belts sandwich the strip and control the upward travel of the strip from the ground toward the housing. In addition, the two endless belts cooperate to control the rate at which the strip is pulled through the housing.

In addition to advancing the state of the art with respect to infill extracting, the present invention also advances the state of the art with respect to collecting the extracted infill. More specifically, as is known in the art, the extracted infill is moved, i.e., conveyed, from the bottom of the housing, as by an auger or a conveyor, to a collector located behind the vehicle. With the present invention, the infill moving structure is preferably an enclosed auger that extends upwardly and rearwardly at an angle from one side of the bottom of the housing, and which is driven by a direct drive mechanism. Near the rear, exit end of the enclosed auger, an infill collector is mounted to the vehicle. The infill collector collects the infill that has been extracted by the extractor, as the vehicle moves along the turf.

According to one preferred embodiment of the invention, the infill collector includes an open bottom frame which holds a bag in a suspended state below an exit end of the auger. For instance, for a bag with a plurality of outer straps, generally four, the frame may include four retainers for holding the four corresponding straps of the bag so as to suspend the bag as it is filled. The retainers cooperate with a lever mounted to the frame. When the lever is activated, for example when the bag is full, the retainers simultaneously rotate relative to the frame to enable the bag to drop to the ground. The rear of the frame includes a rack for holding additional bags, thereby to facilitate the efficient connection of a new bag to be filled, by retaining the four straps of the new bag on the four retainers, which have been rotated back to their holding position.

According to one aspect of the invention, this infill collector is located just to the side of a person who is operating the vehicle, which allows the operator to remain more immediately aware of the status of the infill collecting procedure, and particularly the condition of the bag as it is filled.

According to another aspect of the present invention, the infill collector is mounted so as to be rotatable with respect to the vehicle, about a horizontal axis. In addition, the frame is supported by a pair of spaced wheels which are mounted so as to pivot between an operative position when in use, to an inoperative stowed position when not in use. Still further, the frame is laterally movable relative to the vehicle, so enable use in an outer position, directly below the rear exit end of the auger, and to enable stowing in an inner position, closer to the center of the vehicle, when the wheels are stowed. This feature enables the entire apparatus, i.e., the vehicle, the extractor, and the collector, to be more readily transported to a field site, because the collapsed condition of the structure more easily fits within a given volume.

These and other features of the invention will be more readily understood in view of the detailed description and also the drawings, which are briefly described as follows.

BRIEF DESCRIPTION OF THE DRAWINGS

FIG. 8A and 8B are similar to FIGS. 7A and 7B but show an alternative conveyor structure.

FIGS. 10B and 10C are side elevational views, in partial section, showing a bag retaining device including a lever and a plurality of retainers, with FIG. 10C showing the bag retaining device in a bag retaining position and FIG. 10B showing the bag retaining device in a bag release position.

DETAILED DESCRIPTION OF THE INVENTION

Figure 1:
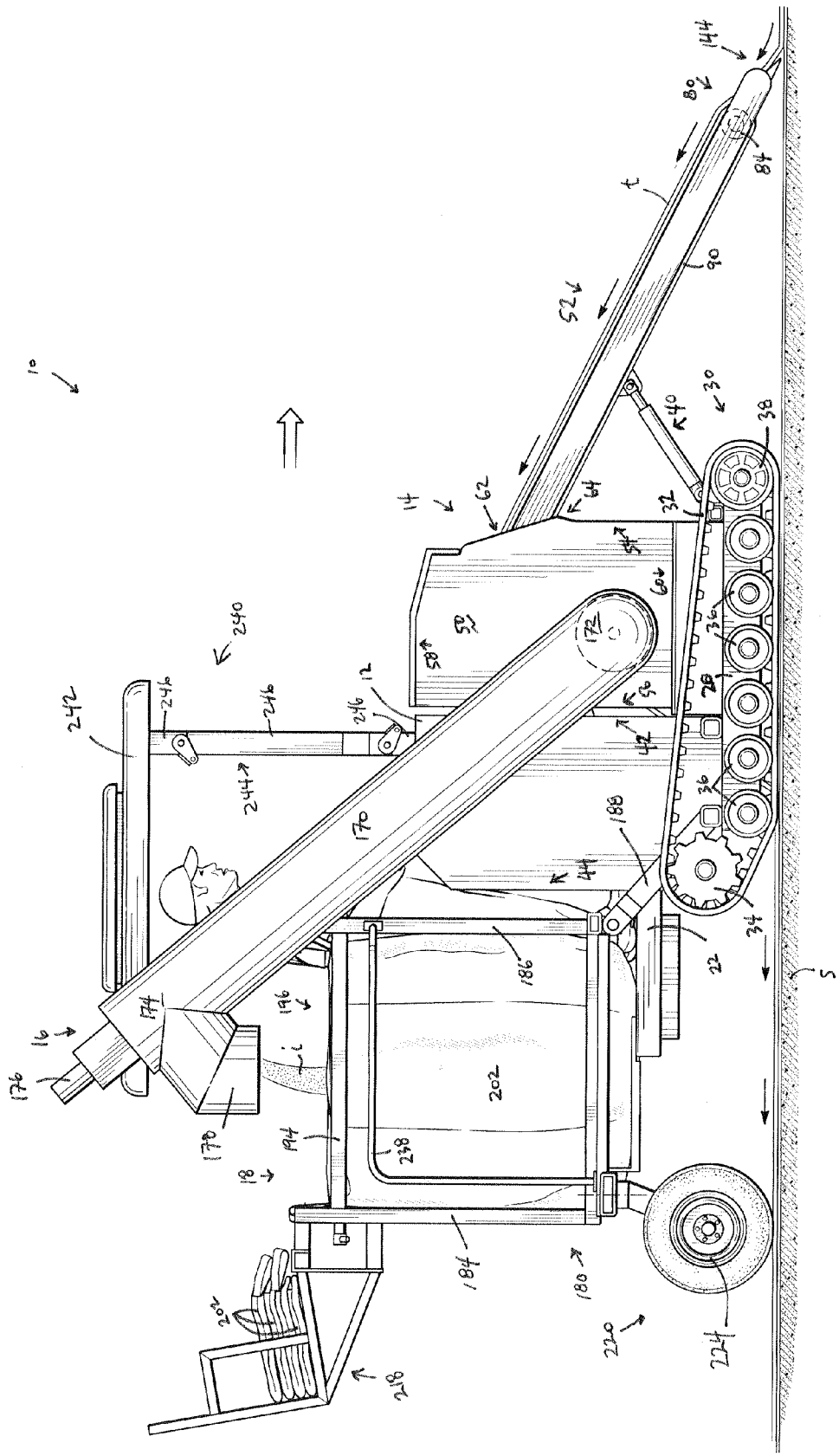
FIG. 1 is a right side elevational view showing an infill extractor/collector constructed according to a first preferred embodiment of the invention.
Figure 2:
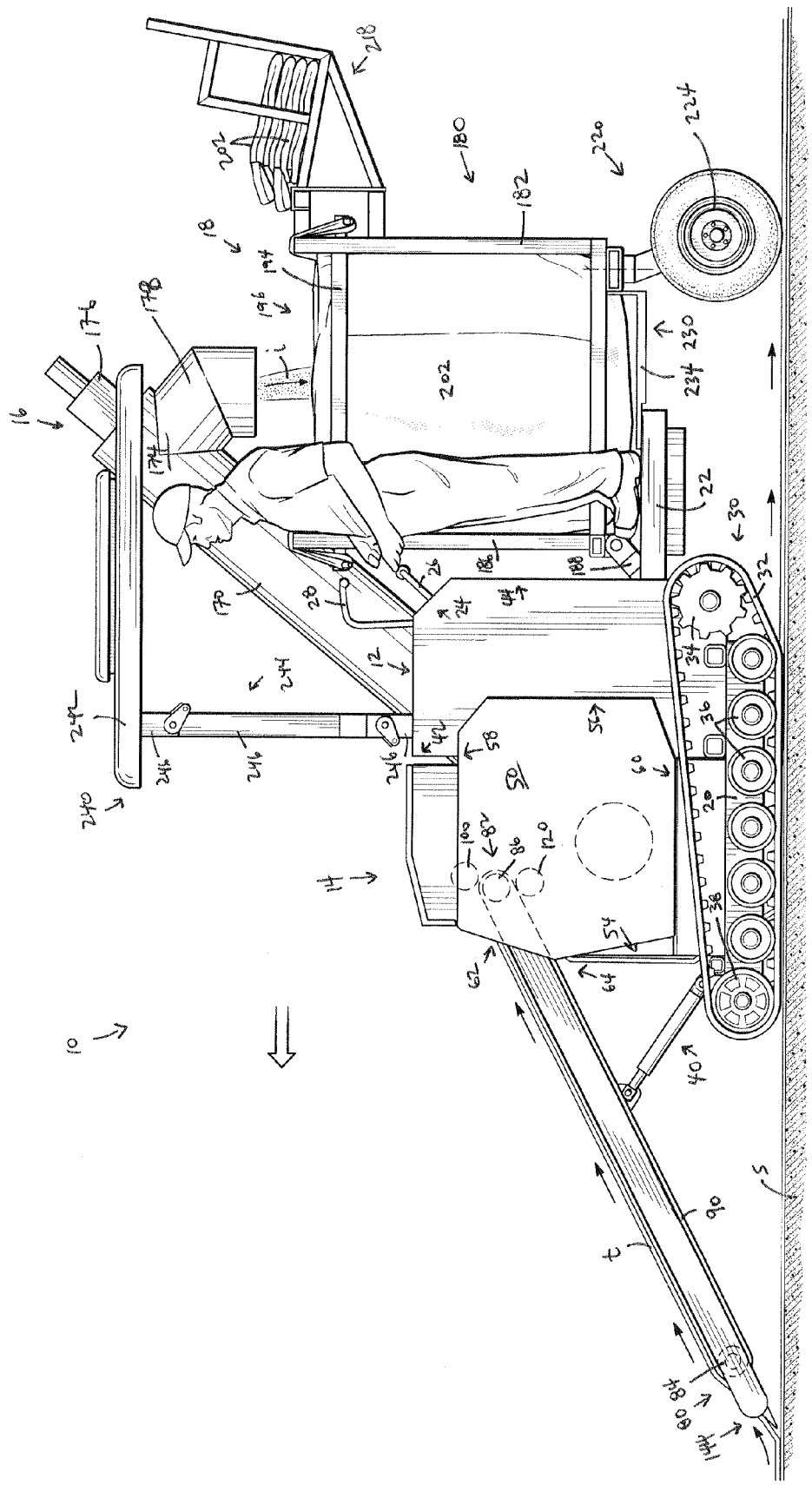
FIG. 2 is a left side elevational view of the infill extractor/collector shown in FIG. 1.

Referring first to FIGS. 1 and 2, an infill extractor/collector 10 is shown and is adapted to extract and collect infill from an infilled artificial turf field. In particular, the infill extractor/collector 10 is adapted to engage a strip of infilled artificial turf and to extract, or remove, some, substantially all, or all of the infill material from the strip of infilled artificial turf. An infilled artificial turf field can be cut into strips prior to use of the infill extractor/collector 10. In addition, the infill extractor/collector 10 is adapted to collect the extracted infill material. As shown in the figures, synthetic turf is generally indicated by the letter t, infill by the letter i, and the ground or subsurface below the synthetic turf by the letter s. These letter designations are not used throughout this textual description, however, to avoid the excessive repetition that would be created if they were.

The infill extractor/collector 10 generally includes a motorized vehicle 12, an infill extractor 14, an infill mover 16, and an infill collector 18. The motorized vehicle 12 generally supports and moves the infill extractor 14, the infill mover 16, and the infill collector 18. The infill extractor 14 is adapted to extract infill from a strip of an infilled athletic turf as the vehicle moves along a field of the infilled athletic turf at a field site. The infill mover 16, in turn, is adapted to move the extracted infill from the infill extractor 14 toward the infill collector 18. The infill collector 18 is adapted to collect the infill that is extracted by the infill extractor 14 and moved by the infill mover 16. In particular, the infill collector 18 is adapted to collect the extracted infill in large bags.

The vehicle 12 includes a chassis 20 to which all its other components are connected, either directly or indirectly. An operator platform 22 is provided, and a user can stand on the operator platform 22 to ride with the vehicle 12, as shown in FIGS. 1 and 2. A control console 24 is provided with controllers 26 for controlling or operating the vehicle 12. A handlebar 28 is provided near the control console 24 for a user to grab, such as for support while stepping onto the operator platform 22.

The vehicle 12 includes endless drive track assemblies 30 having endless tracks 32, which may also be referred to as treads. A drive sprocket 34 transfers rotational power to the tracks 32, which rotate around a series of intermediate rollers 36 and front rollers 38. The vehicle 12 also includes a lift assembly 40 for causing movement of an attachment to the vehicle, as will be described further below. The vehicle 12 has a first, or forward, end 42, and a second, or rearward, end 44. As shown in FIGS. 1 and 2, the operator is standing on the operator platform 22 and looking in a forward facing direction of the vehicle 12.

Figure 3:
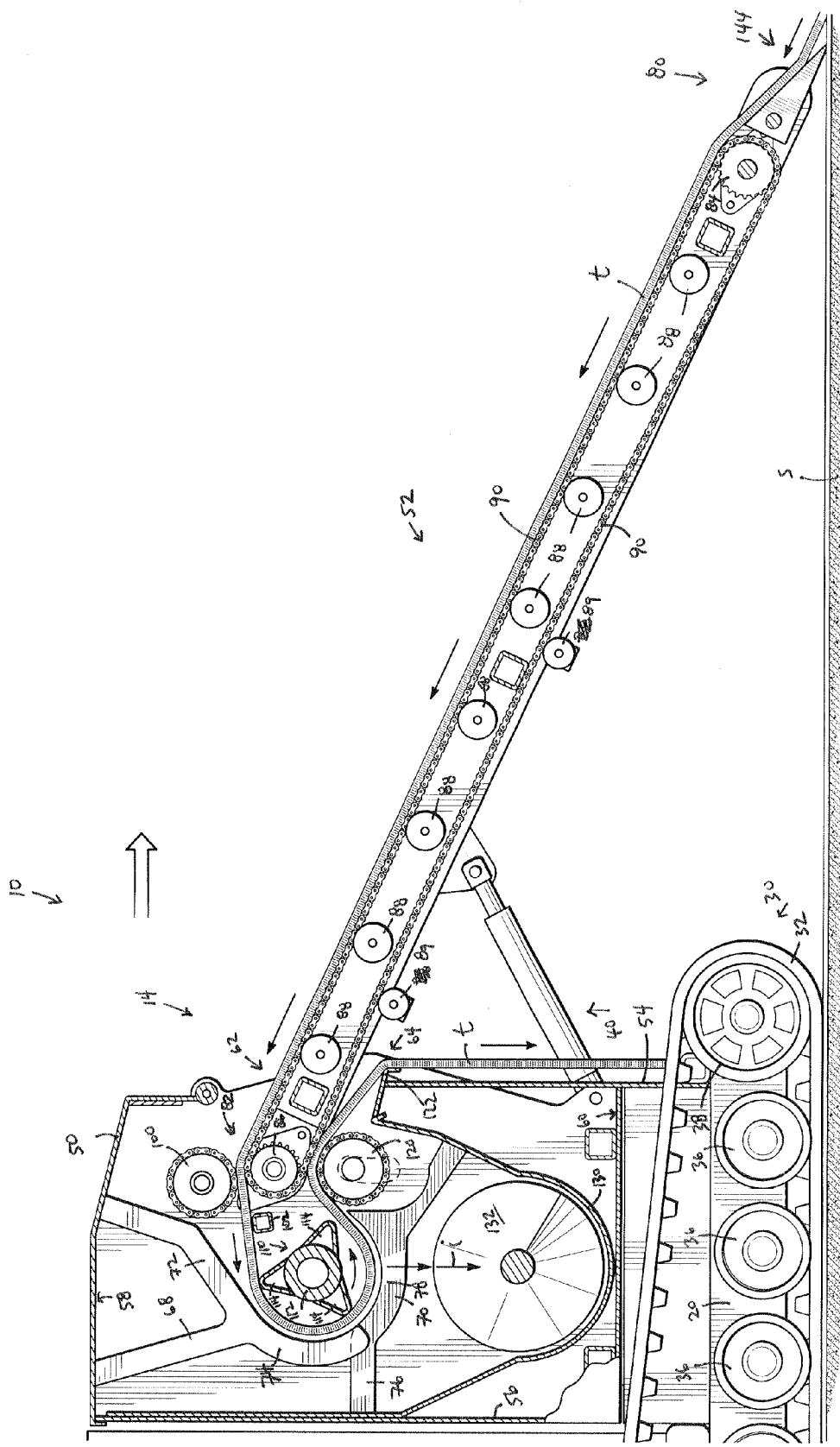
FIG. 3 is a partial cross sectional view, showing features of the infill extractor/collector shown in FIG. 1, including a conveyor for directing a strip of infilled artificial turf into a housing.
Figure 4:
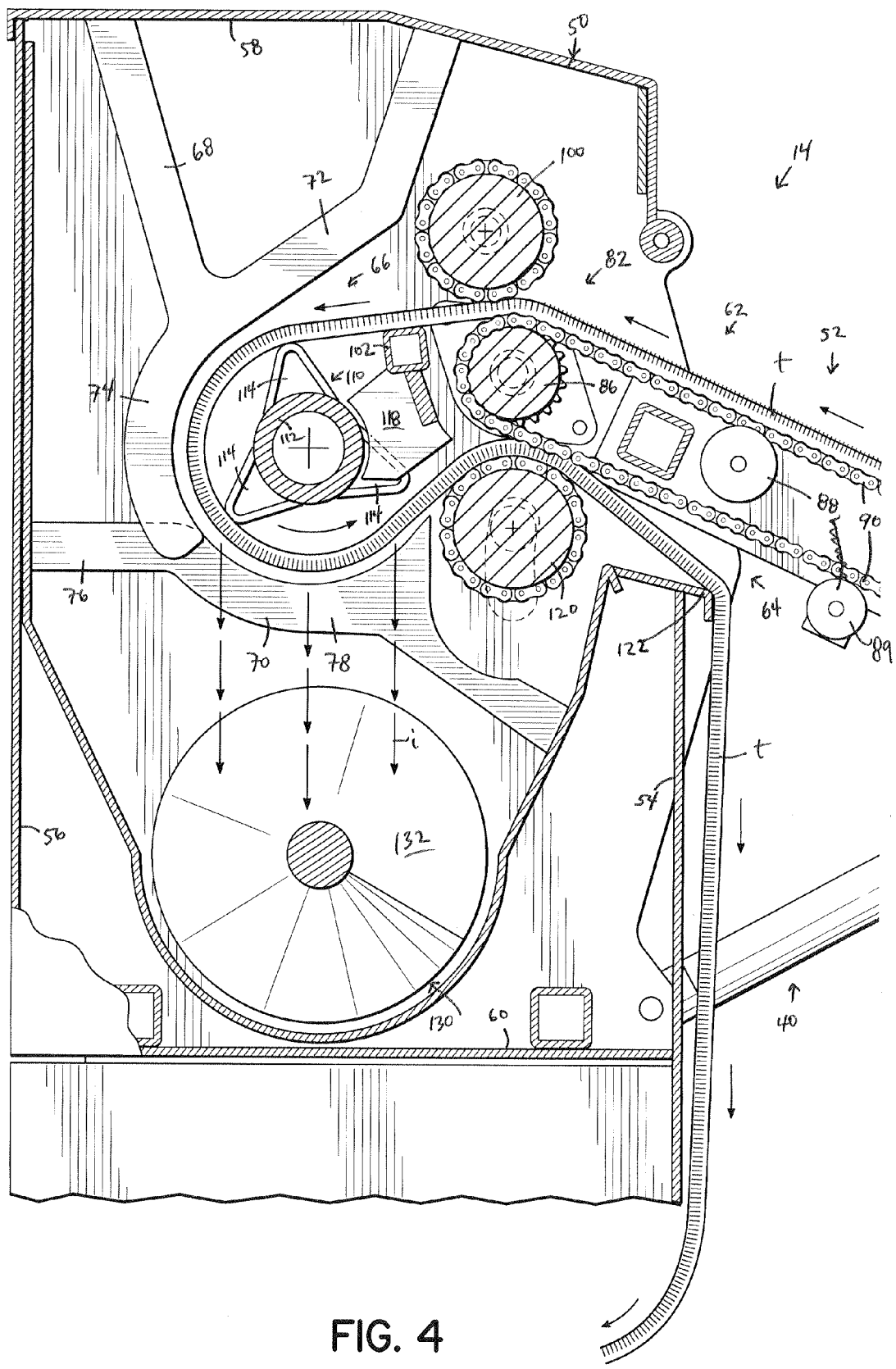
FIG. 4 is a partial cross sectional view, showing additional features of the infill extractor/collector shown in FIG. 1, including an agitator for contacting the strip of artificial turf as it traverses a path in the housing.
Figure 5:
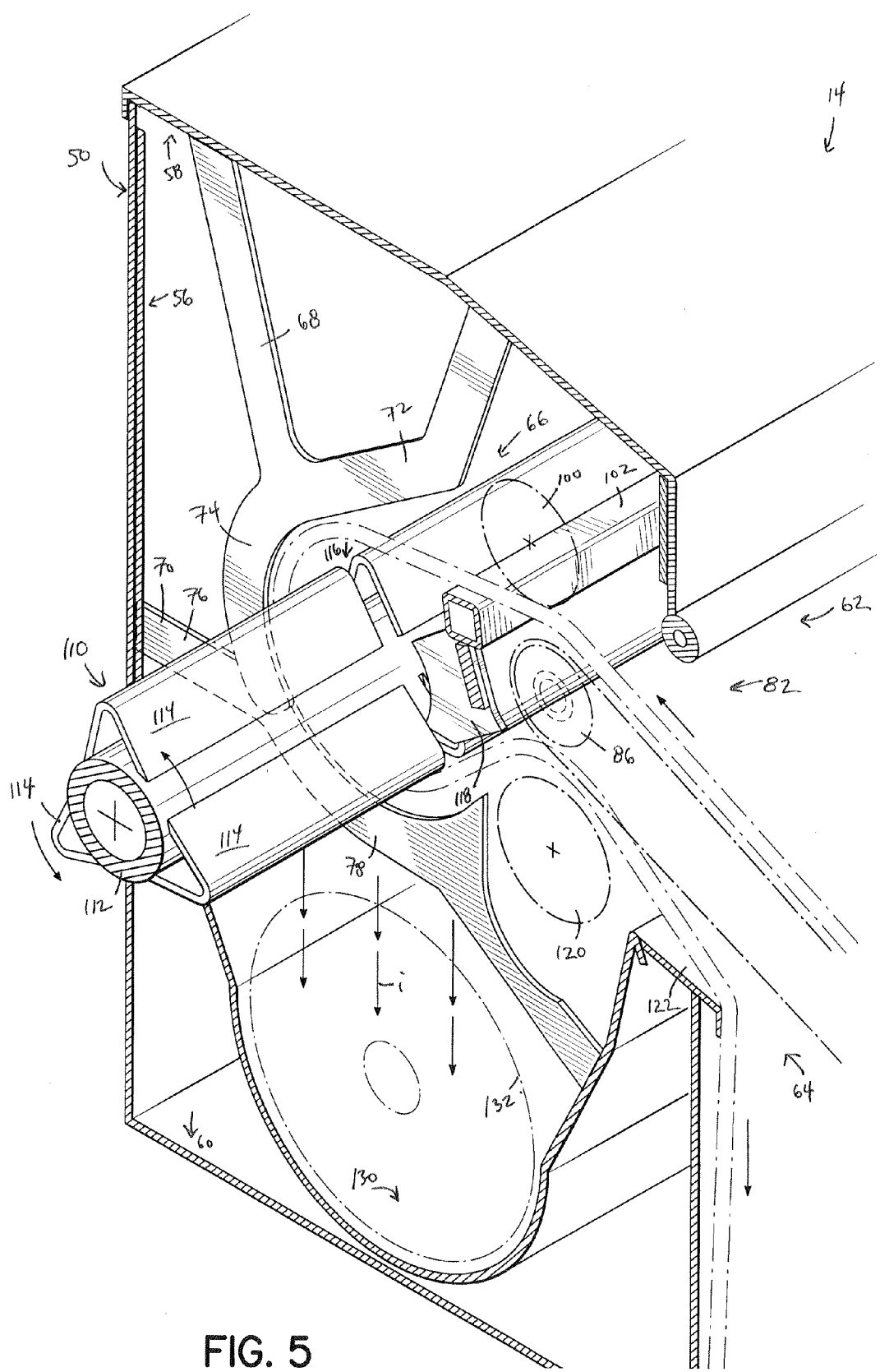
FIG. 5 is a schematic view, in partial section, showing additional features of the infill extractor/collector shown in FIG. 1, including strippers for directing the strip of artificial turf away from the agitator and toward an exit of the housing.

Referring next to FIGS. 3-5, the infill extractor 14 is further described. Again, the infill extractor 14 is adapted to extract infill from a strip of infilled turf. The infill extractor 14 is mounted to the vehicle 12 at the first end 42 thereof and generally includes a housing 50 and a conveyor 52. The conveyor 52 is adapted to direct the strip of turf to the housing 50. Components and features inside the housing 50 act on the strip of turf to extract infill therefrom.

The housing 50 includes a first, forward, end 54 and a second, rearward, end 56. The housing 50 also generally includes a top 58 and a bottom 60. The housing generally includes a lid at, and forming part of, the top 58. A housing entrance 62 is situated at the first end 54 adjacent the top 58. A housing exit 64 is also situated at the first end 54, but is below the housing entrance and between the top 58 and the bottom 60 of the housing 50. The housing entrance 62 is above the housing exit 64. A strip of turf follows a path 66 that is defined within the housing 50 between the housing entrance 62 and the housing exit 64.

As best seen in FIGS. 3 and 4, the path 66 is partially defined by structural housing members 68, 70 contained within the housing 50. Structural housing members 68 extend downwardly from the top 58 toward the bottom 60, and structural housing members 70 extend forwardly from the second end 56 toward the first end 54. Each structural housing member 68 includes a generally straight portion 72 and a curved portion 74 located rearward of the straight portion 72. Each structural housing member 70 includes a generally straight portion 76 and a curved portion 78 located forward of the straight portion 76. Structural housing members 68, 70 cooperate to partially define the path 66 that the strip of turf follows as it traverses through the housing 50 between the housing entrance 62 and the housing exit 64. In particular, the curved portions 74, 78 define a region where the turf is bent through a radius and inverted within the housing 50.

The conveyor 52 extends between a first, forward, end 80 and a second, aft or rearward, end 82. The first end 80 is adapted to engage the strip of turf near the subsurface as the turf is pulled up and separated from the subsurface. In the embodiment shown, the second end 82 is situated within the housing 50. The strip of turf is directed off the conveyor 52 at the second end 82 and is directed toward the path 66 that the turf follows within the housing 50. The conveyor 52 includes main rollers 84, 86 near the first and second ends 80, 82, respectively, and intermediate rollers 88 therebetween. Advantageously, one or both of the main rollers 84, 86 is a driven roller. The intermediate rollers 88 are generally passive rollers. The conveyor 52 includes an endless belt 90 that is wrapped around the rollers 84, 86 and is supported internally along its length between the first and second ends 80, 82 by the intermediate rollers 88. Optionally, the belt 90 can also be supported by external support rollers 89. The endless belt 90 is adapted to support the strip of turf and to move it upwardly from the first end 80 to the second end 82. The endless belt 90 may be a chain-link style belt, for example.

A tension roller 100 is provided in the housing 50 generally adjacent the conveyor 52 near the second end 82. The tension roller 100 is positioned generally above the main roller 86 and is adapted to cooperate with the conveyor 52 to compress the strip of turf as the strip moves into the housing 50 toward the path 66. The tension roller 100 may be passive or driven. As best seen in FIGS. 3 and 4, when the strip of turf reaches the second end 82, it is compressed between the main roller 86 and the tension roller 100, and is then directed toward the second end 56 of the housing 50. In particular, after the strip of turf exits the conveyor 52, it is directed over a cross bar 102 within the housing 50. The cross bar 102 partially defines the path 66 that the strip of turf traverses within the housing 50.

After moving over the cross bar 102, the strip of turf is contacted by a single agitator 110 in the housing 50. As shown, the structural housing members 68, 70 partially circumscribe the agitator 110. The agitator 110 is adapted to contact the strip of turf as it moves along the path 66 and to separate infill from the strip. In particular, the agitator 110 includes a central shaft 112 with three protrusions 114 extending from the shaft 112 so that the agitator 110 has a generally triangular shape in transverse cross section. The shaft 112 is caused to rotate so that the protrusions 114 sequentially contact the strip of turf in the housing 50.

A plurality of vertically oriented openings 116 are disposed along the length of the agitator 110, dividing each protrusion 114 into a plurality of segments along the length of the agitator 110. The openings 116 are adapted to interact with generally fin-shaped strippers 118 which depend downwardly from the cross bar 102 generally forward of the central shaft 112. In particular, the strippers 118 fit within the openings 116 and are adapted to direct the strip of turf away from the agitator 110 as the strip travels along the path 66 toward the housing exit 64. Thereby, the strippers 118 also partially define the path 66. As the strip traverses the path 66, as shown in FIG. 4, the agitator 110 contacts the strip through an arc of about 270 degrees.

A pulling roller 120 is provided in the housing 50 generally beneath the second end 82 of the conveyor 52. The pulling roller 120 is adapted to cooperate with the conveyor 52 to pull the strip along the path 66 and then direct the strip out of the housing exit 64. The pulling roller 120 may be passive or driven, and advantageously may be driven at a rate faster than either the tension roller 100 or the conveyor 52 in order to keep tension in the strip of turf while it is in the housing 50.

The housing 50 includes a lip 122 at the housing exit 64 that protrudes forward of the first end 54 of the housing 50. The lip 122 is adapted to guide the strip as it exits the housing 50. As shown in FIG. 4, the tension roller 100, the conveyor 52, and the pulling roller 120 are substantially aligned vertically.

Thus, a strip of turf that is guided up the conveyor 52 enters the housing entrance 62 and passes between the tension roller 100 and the second end 82 of the conveyor 52 as it is directed toward the second end 56 of the housing 50. The strip follows the path 66, guided by the structural housing members 68, 70, and is directed downwardly in the housing 50. The strip is inverted at some point generally in the vicinity of the curved portions 74, 78. The strip is further directed back toward the first end 54 of the housing 50, and is also guided by the strippers 118. The strip is contacted by the agitator 110. The strip passes between the pulling roller 120 and the second end 82 of the conveyor 52 as it is directed toward the housing exit 64. The strip is further guided by the lip 122 as it exits the housing 50 at the housing exit 64. The strip is then directed downwardly toward and past the bottom 60 of the housing 50. The strip is then returned to the subsurface beneath the infill extractor/collector 10 and between the tracks 32 of the vehicle 12. In particular, the strip of turf is inverted again so that it is returned to the subsurface in the same general orientation as it existed before being picked up by the infill extractor/collector 10.

When the strip of infilled turf is contacted by the agitator 110, infill material contained in the strip is extracted from the strip. This extracted infill falls past the structural housing member 70 and into a bottom section 130 of the housing 50, as indicated in FIG. 4. A conveying device, such as an auger 132, is positioned within the bottom section 130 to direct the extracted infill to an exit of the housing 50, where the extracted infill is handled by the infill mover 16, as will be explained below.

Figure 6:
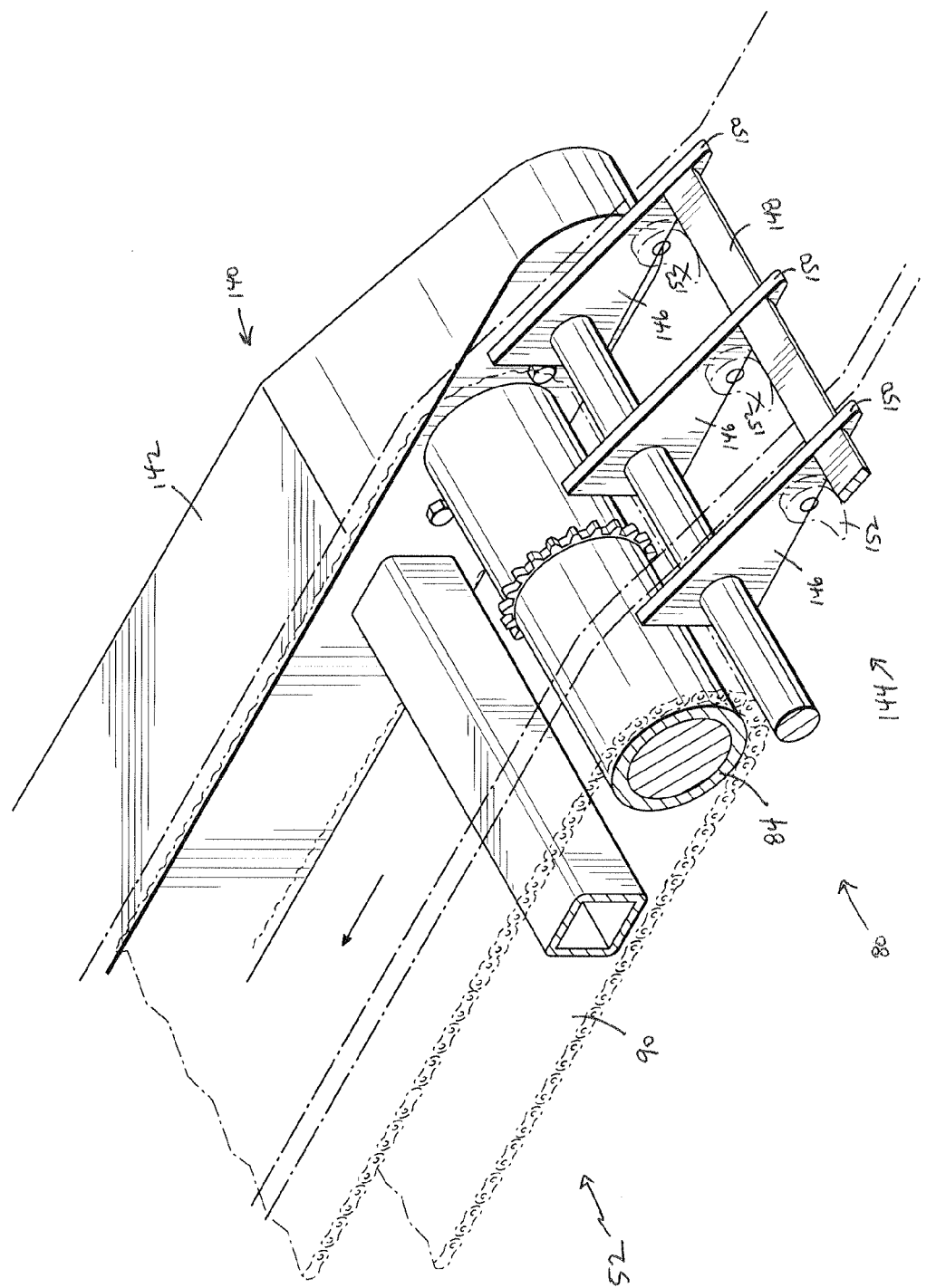
FIG. 6 is an isometric view, in partial section, showing various details of a conveyor located at the forward end of the infill extractor/collector shown in FIG. 1.
Figure 7A:
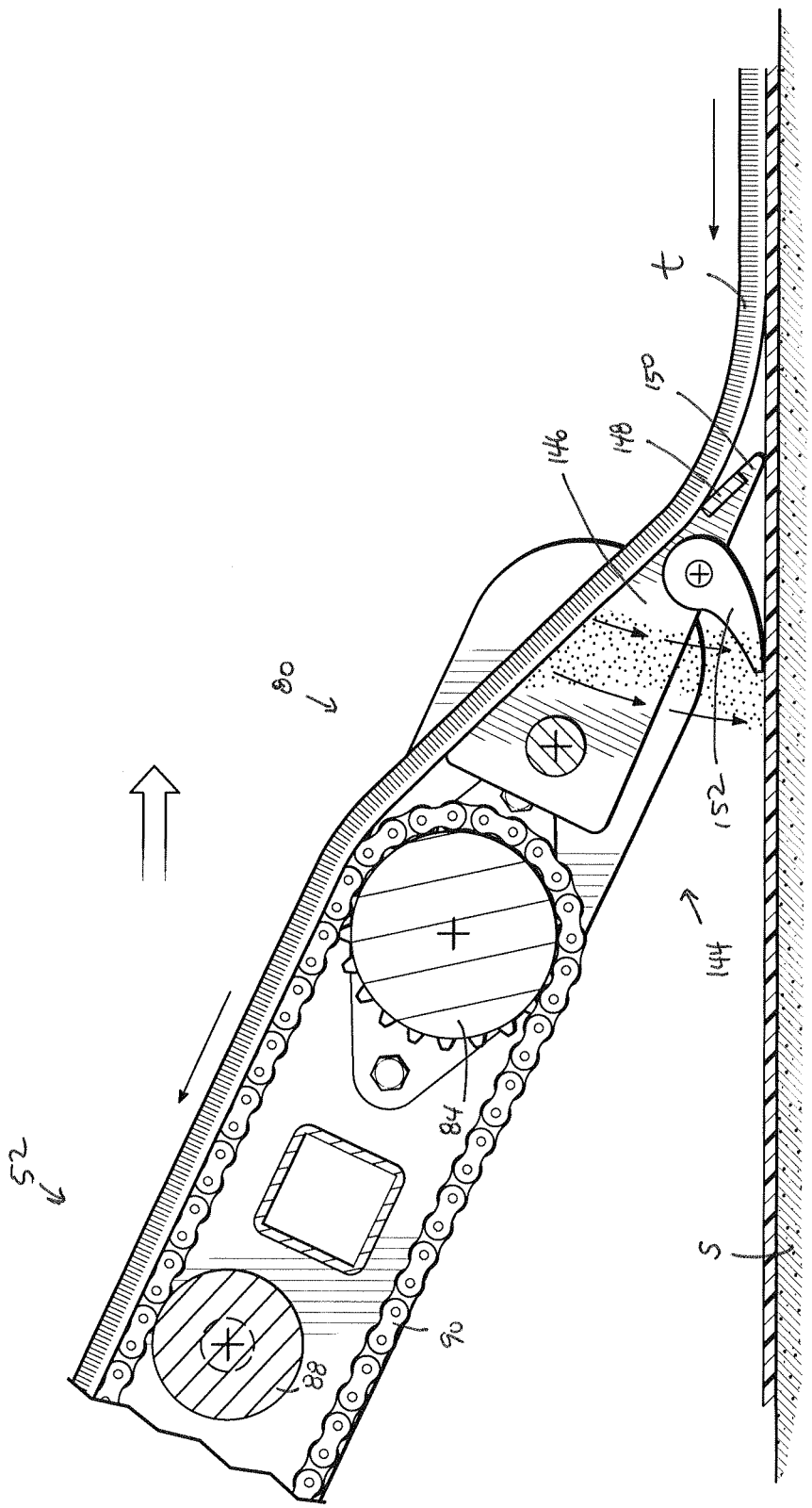
FIG. 7A is a partial cross sectional view, in partial cross section, showing the conveyor of FIG. 6 as it engages a strip of artificial turf and directs the strip up from the ground to a belt of the conveyor.
Figure 7B:
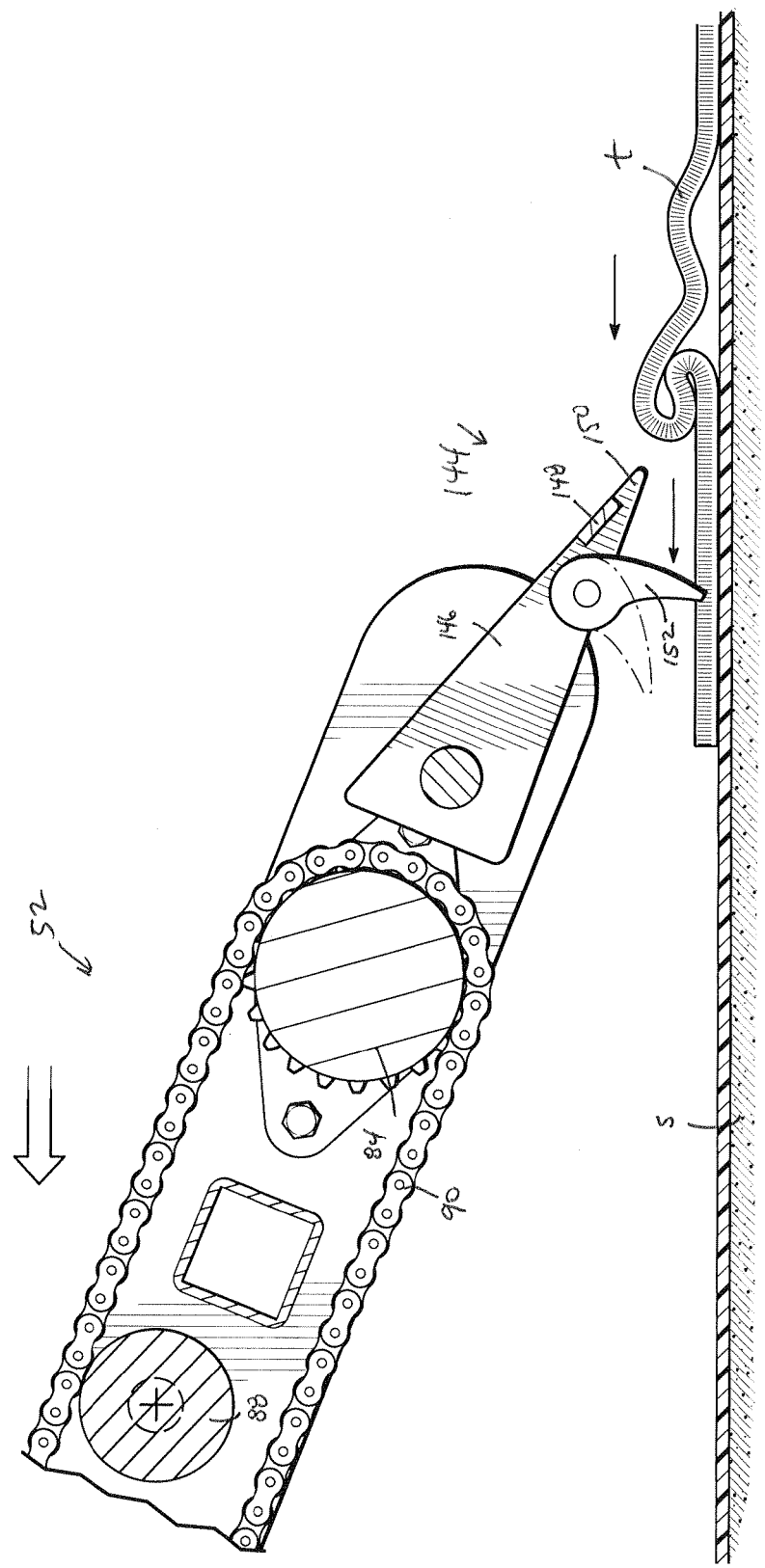
FIG. 7B is a view similar to FIG. 7A, and showing a pawl element in a forward end of the conveyor, as the pawl element engages a bunched up portion of the strip of artificial turf

Referring next to FIGS. 6, 7A, and 7B, additional details of the conveyor are shown. The conveyor 52 includes a catwalk 140 that extends along a length of the side of the conveyor 52. The catwalk 140 includes a surface 142 that is adapted to serve as a platform for a user to stand on in order to manipulate the strip on the conveyor 52, for example.

The conveyor 52 also includes a feed device 144 mounted at the first end 80 of the conveyor 52. The feed device 144 is adapted to direct a strip of turf upwardly from the subsurface and toward the belt 90 of the conveyor 52. The feed device 144 includes a plurality of spaced fingers 146, which are generally wedge-shaped. The fingers 146 are connected by a connecting bar 148 generally near the tips 150 of the fingers 146. Spacings between the fingers 146 allows particulate from the subsurface to fall back to the surface, rather than becoming inadvertently trapped on the top surface of the belt 90 and then directed into the housing 50.

As shown in FIGS. 7A and 7B, a pawl 152 is pivotally connected with, and extends partially below, each finger 146. The pawls 152 are adapted to engage the strip of turf. For example, as shown in FIG. 7B, if a user of the infill extractor/collector 10 encounters a bunched up portion of a strip of turf, the user can use the pawls 152 to engage the strip of turf and eliminate the bunching. The lift assembly 40 of the vehicle 12 is used, for example, to lift the conveyor 52 and then lower it so that the pawls 152 are brought into engagement with the bunched up portion of turf. The vehicle 12 is then operated, such as by moving it away from the strip of turf to straighten out the bunched up portion of turf, as indicated by the arrows in FIG. 7B. Once the strip of turf is straightened, the tips 150 of the fingers 146 can be inserted between the strip of turf and the subsurface below it. The vehicle 12 is then moved toward the strip of turf, thereby causing the strip of turf to be directed up the fingers 146 so that it can be engaged by the belt 90 and directed further toward the housing 50, as shown in FIG. 7A.

Referring next to FIGS. 8A and 8B, alternative structure for the conveyor 52 is shown. A feed device 160 is mounted at the first end 80 of the conveyor 52. Like the feed device 144, the feed device 160 is adapted to direct a strip of turf upwardly from the subsurface and toward the belt 90 of the conveyor 52. The feed device 160 includes a plurality of sprockets 162 having teeth 164 adapted to engage and grip the strip of turf. The sprockets 162 are mounted on a rotating shaft 166. Rotation of the shaft 166 causes rotation of the sprockets 162, as indicated in FIG. 8A, so that the teeth 164 grab the strip of turf and direct it upwardly away from the subsurface and toward the belt 90 of the conveyor 52.

Referring next to FIGS. 1, 9, 11A, and 12, features of the infill mover 16 are shown. Again, the infill mover 16 is adapted to move extracted infill from the infill extractor 14 toward the infill collector 18. The infill mover 16 includes an enclosure or conduit 170 in which the extracted infill is moved. As shown in FIG. 1, the conduit 170 is operatively connected with the housing 50 of the infill extractor 14 to receive the extracted infill therefrom. In particular, the conduit 170 has a first, or inlet, end 172 that is coupled with the housing 50 in the vicinity of the bottom section 130. As also shown in FIG. 1, the conduit 170 has a second, or exit, end 174 that is rearward of and above the first end 172. The second end 174 is rearward of the second end 44 of the vehicle 12. The infill mover 16 further includes an auger enclosed within the conduit 170. Thus, the auger extends at an angle rearwardly and upwardly from the bottom section 130 of the housing 50 of the infill extractor 14.

The auger is adapted to move extracted infill in the conduit 170 from the first end 172 to the second end 174. A drive mechanism 176 is operative to drive the auger, and may be mounted on the vehicle 12 or on the conduit 170, as shown. Thereby, extracted infill in the bottom section 130 of the housing 50 is moved rearwardly by the auger to the second end 174 of the conduit 170, where it can be collected by the infill collector 18. As shown in FIGS. 1 and 2, the second end 174 of the conduit 170 is located at about eye level for a user standing on the operator platform 22. Optionally, a down chute 178, such in the form of a conduit extension or a flexible sleeve, is coupled with the conduit 170 near the second end 175 in order to assist in directing the extracted infill from the infill mover 16 to the infill collector 18.

Referring next to FIGS. 9, 10A-10D, and 11A-11D, features of the infill collector 18 are shown. Again, the infill collector 18 is adapted to collect the extracted infill that is moved away from the infill extractor 14 by the infill mover 16. The infill collector 18 is connected to the second end 44 of the vehicle 12 and includes a frame 180 that is laterally moveable relative to the vehicle 12 from an operative "in use" position to a stowed position when not in use. Advantageously, the infill collector 18 is located just to the side of the user who is standing on the operator platform 22.

Figure 11A:
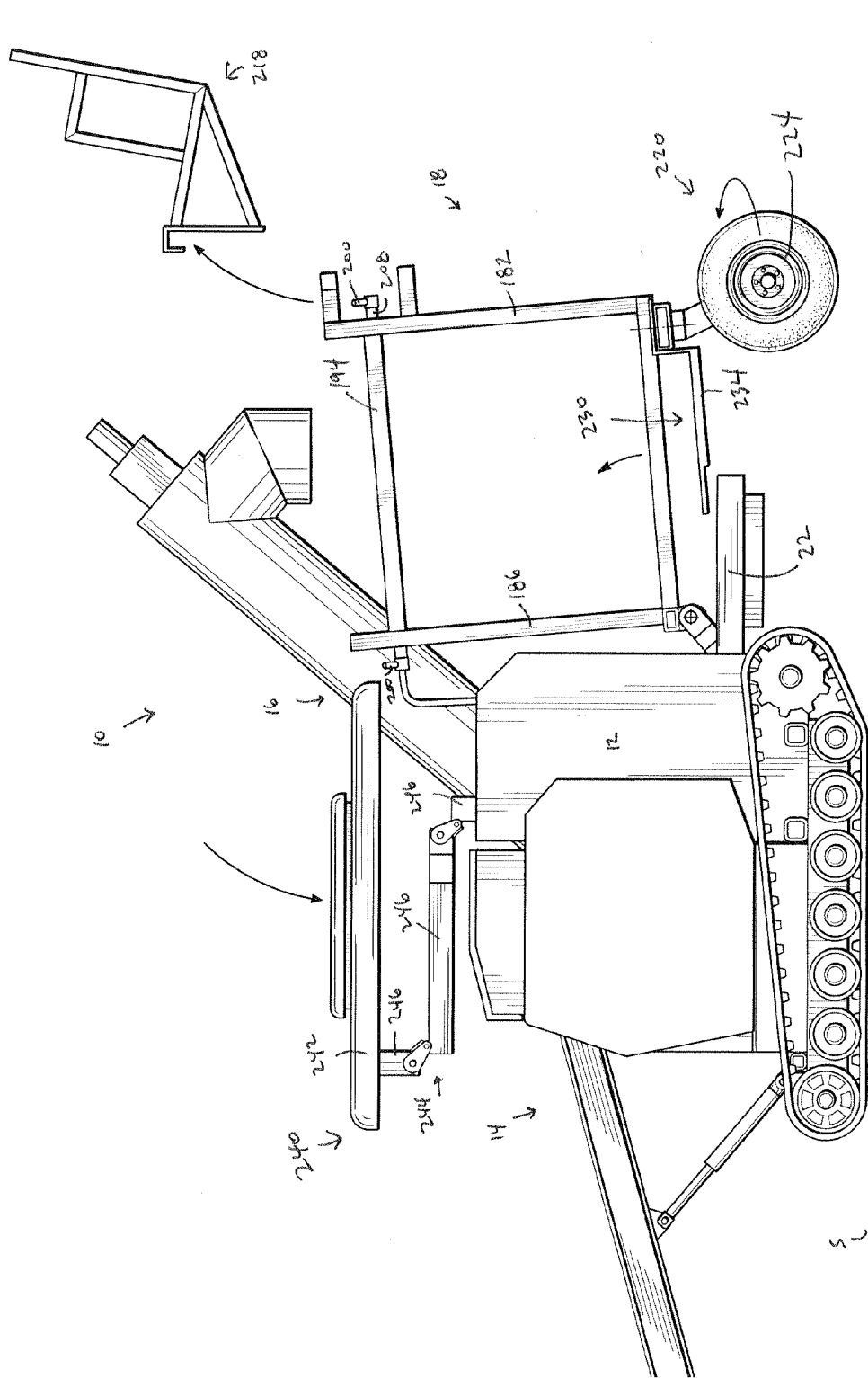
FIG. 11A is a left side elevational view showing a canopy in a retracted position, and a rack for attachment to an aft top end of a frame of the infill collector.
Figure 11B:
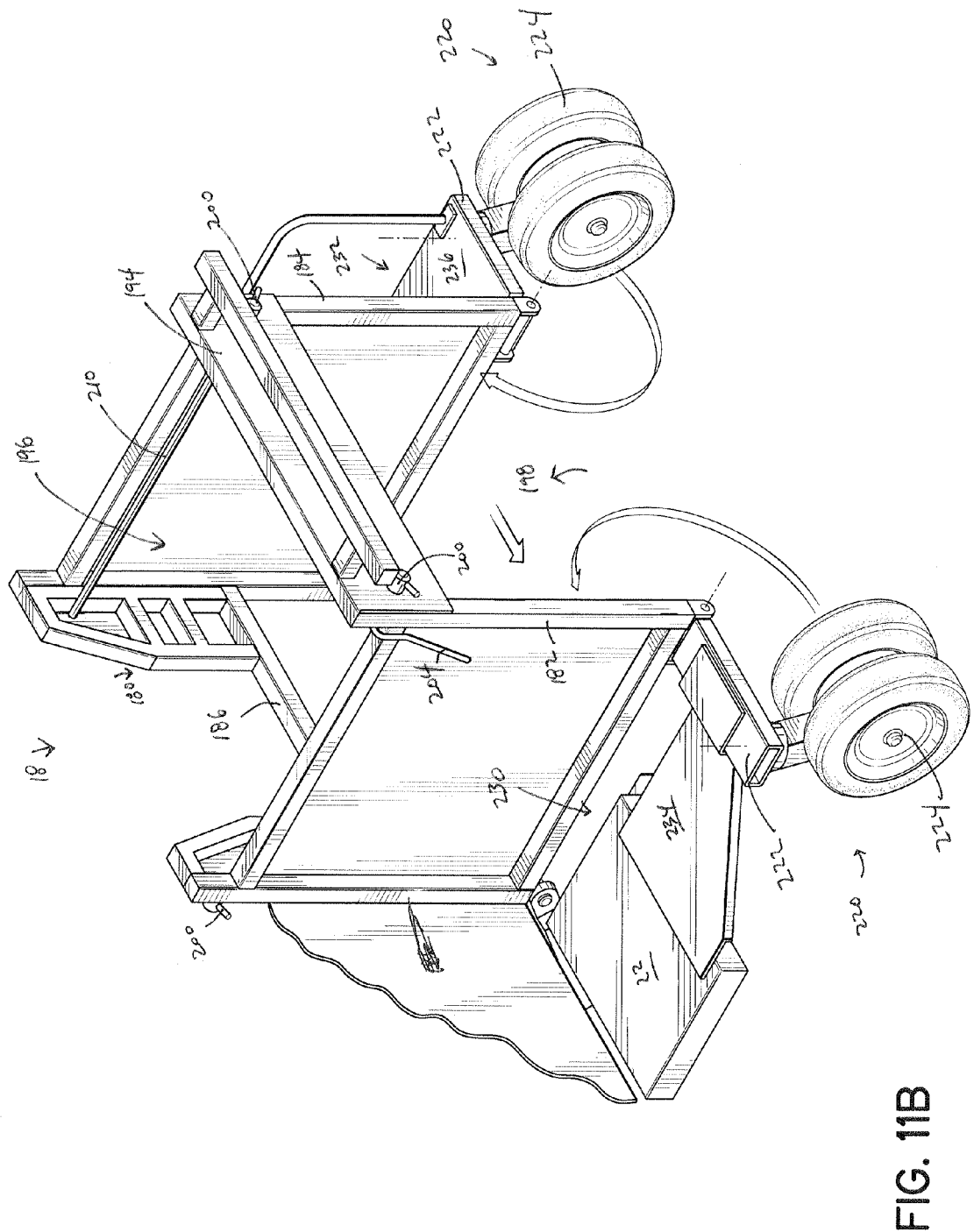
FIG. 11B is a rear isometric view showing features of the frame of the infill collector, including pivotal wheel structures which are pivoted to their in use position.
Figure 11C:
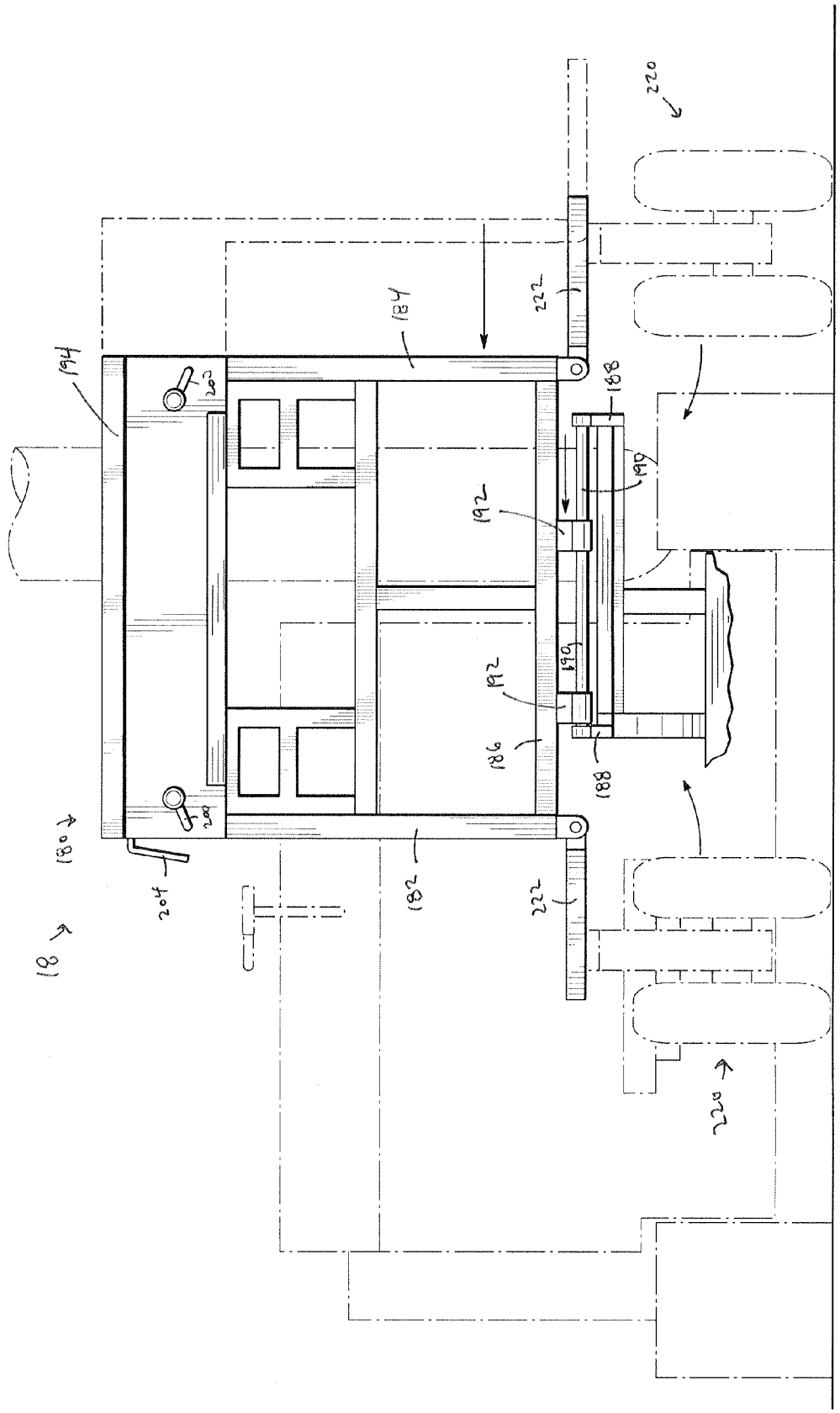
FIG. 11C is a rear elevational view showing the infill collector being translated toward the left (as viewed in the Figure) toward a center line of the infill extractor/collector.

The frame 180 includes at least a pair of spaced walls 182, 184. The walls 182, 184 are laterally spaced and extend rearwardly from the vehicle 12. In the embodiment shown, the frame 180 also includes a forward wall 186, and the walls 182, 184 are connected through the forward wall 186. The forward wall 186 is connected with the vehicle 12. In particular, a mounting bracket 188 extends rearwardly from the vehicle 12, and the forward wall 186 is connected with the mounting bracket 188. The mounting bracket 188 includes a laterally extending bar 190, and mounting connectors 192 on a lower portion of the forward wall 186 are connected to the bar 190. The mounting connectors 192 can move laterally on the bar 190, thereby allowing the frame 180 to be moved laterally relative to the vehicle 12. The mounting connectors 192 can also pivot on the bar 190, thereby allowing the frame 180 to be pivoted on a horizontal axis relative to the bar 190. In particular, the frame 180 is pivotal about a horizontal axis that is perpendicular to a forward facing direction of the vehicle 12, as indicated in FIG. 11A.

The frame 180 further includes an upper support structure 192. The upper support structure 192 extends between the walls 182, 184. The upper support structure 192 and the walls 182, 184 define an infill collection station 196 having an open bottom 198.

Figure 9:
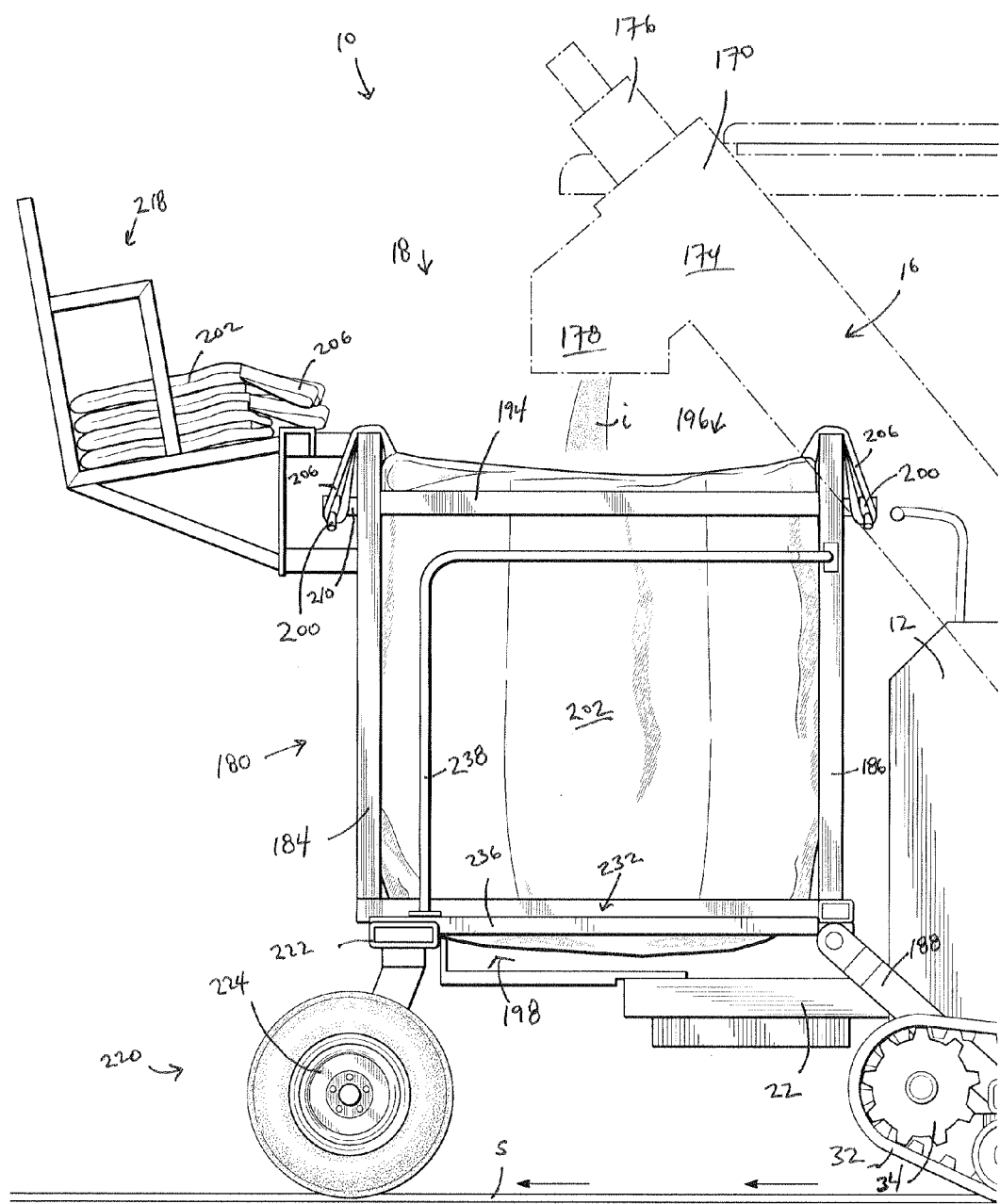
FIG. 9 is a right side elevational view showing the infill collector of the infill extractor/collector shown in FIG. 1
Figure 10A:
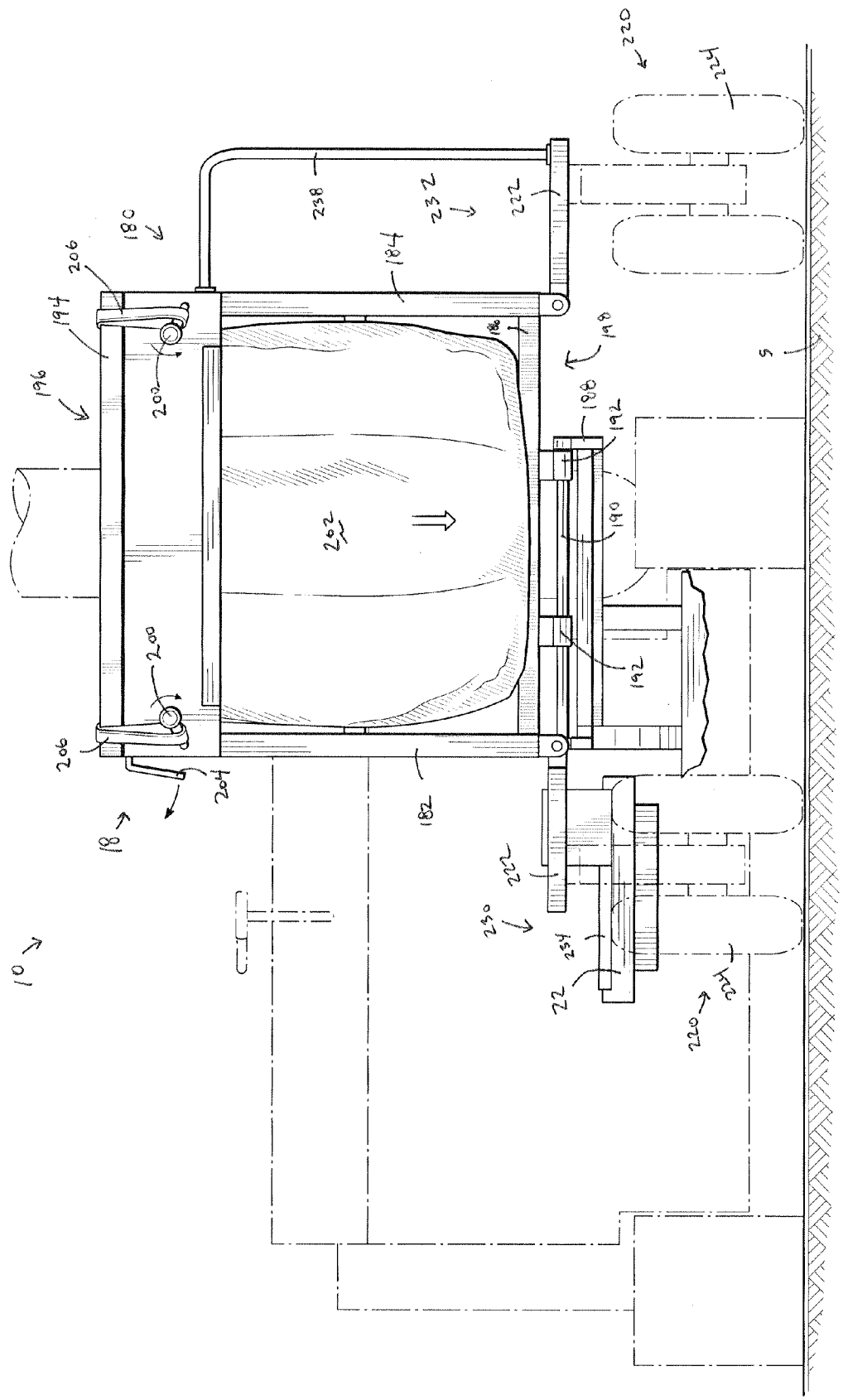
FIG. 10A is a rear elevational view showing the infill collector shown in FIG. 9, and including a bag retained in an open condition of an infill collection station, for receiving extracted infill.
Figure 10D:
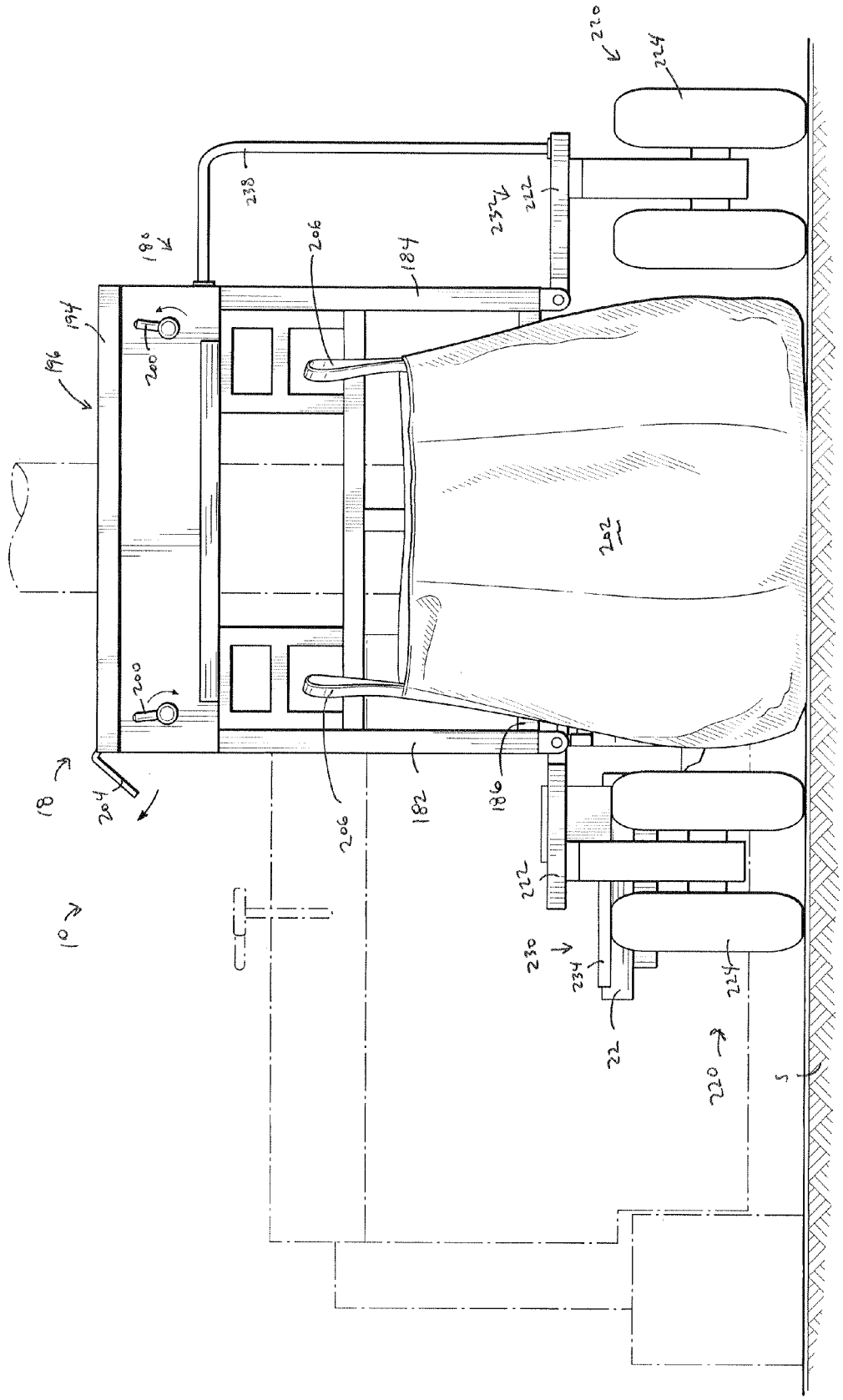
FIG. 10D is a rear elevational view showing the infill collector of FIG. 9, with the bag having been released from the infill collection station.

A plurality of retainers 200 are mounted on the upper support structure 194 and are adapted to selectively retain a bag 202 in the infill collection station 196. A lever 204 is operatively connected to the retainers 200 and is adapted to move the retainers 200 relative to the upper support structure 194 between a bag retaining position and a bag release position. The bag retaining position is shown in FIGS. 9, 10A, and 10C, for example, and the bag release position is shown in FIGS. 10B and 10D. In the bag retaining position, the retainers 200 each retain a strap 206 of the bag 202, as shown, so that the bag 202 is held in a suspend state in the infill collection station 196 generally below the down chute 178 of the infill mover 16. In the embodiment shown, the retainers 200 adjacent the wall 182 are maintained on a common shaft 208 and the retainers 200 adjacent the wall 184 are maintained on another common shaft 210. The common shafts 208, 210 are connected by a linkage 212. The lever 204 is connected with the common shaft 208, as shown in FIGS. 10B and 10C. Rotational movement of the lever 204 is transferred to the common shaft 208 and to the common shaft 210 through the linkage 212. The linkage 212 includes a biasing member, such as a spring 214, which tends to act on the linkage 212 to move the common shafts 208, 210 to return the retainers 200 to their bag retaining position.

Thus, with the retainers 200 in the bag retaining position, the straps 206 of a bag 202 can be placed onto the retainers 200 so that the bag 202 is in an open configuration in the infill collection station 196. Operation of the infill extractor/collector 10 will cause extracted infill to be directed by the infill mover 16 from the infill extractor 18 up the conduit 170. The extracted infill exits the conduit 170 and is directed into and received in a bag 202, as indicated in FIGS. 1 and 9, for example. When the bag 202 becomes full, a user can release the bag 202 from the infill collection station 196 by operating the lever 204 to move the retainers 200 to their bag release position. The bag 202 is then released, as shown in FIG. 10D. The retainers 200 are then returned to their bag retaining position and another bag 202 can be placed in the infill collection station 196 for further collection of extracted infill.

A rack 218 is mounted at an aft, or rearward, top end of the upper support structure 194 and is adapted to support one or more bags 202 for use with the infill collector 18.

Figure 11D:
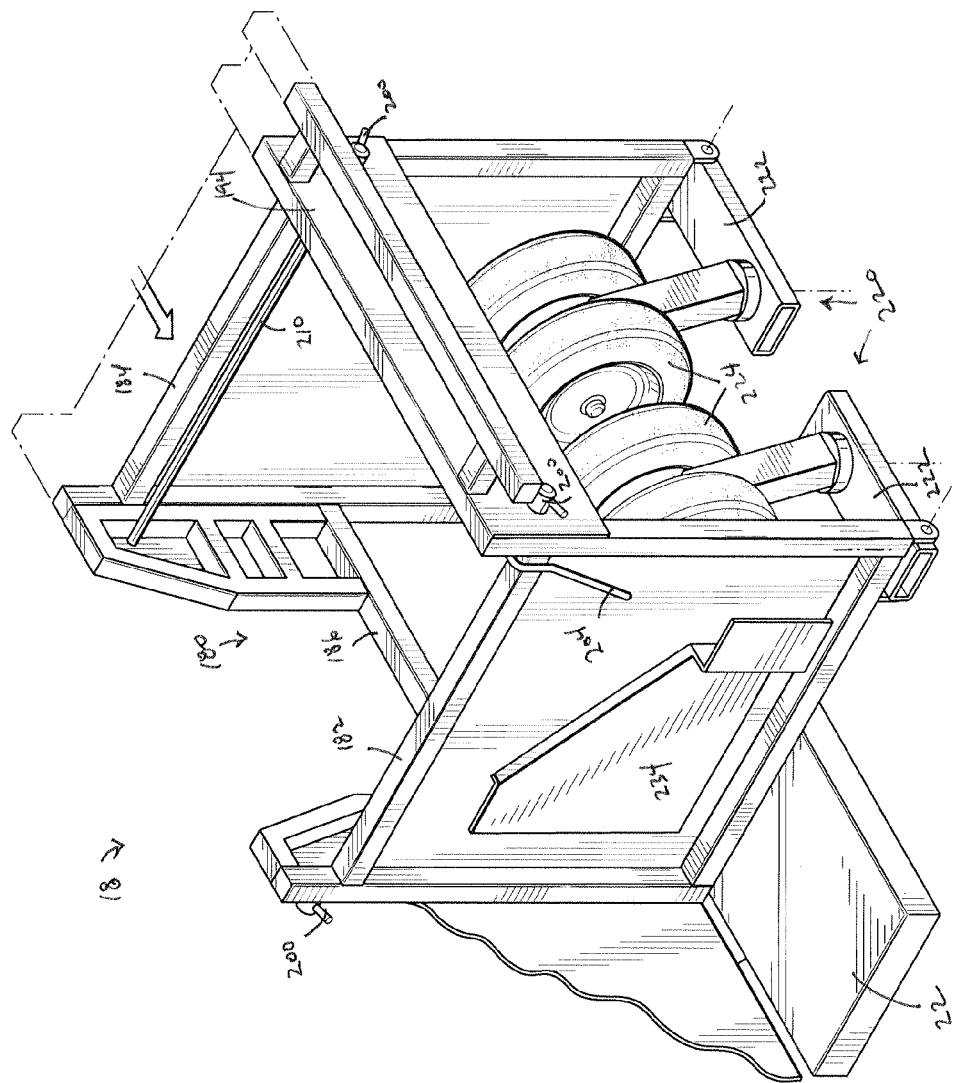
FIG. 11D is a rear isometric view like FIG. 11B, but with the wheel structures pivoted to their stowed position.
Figure 12:
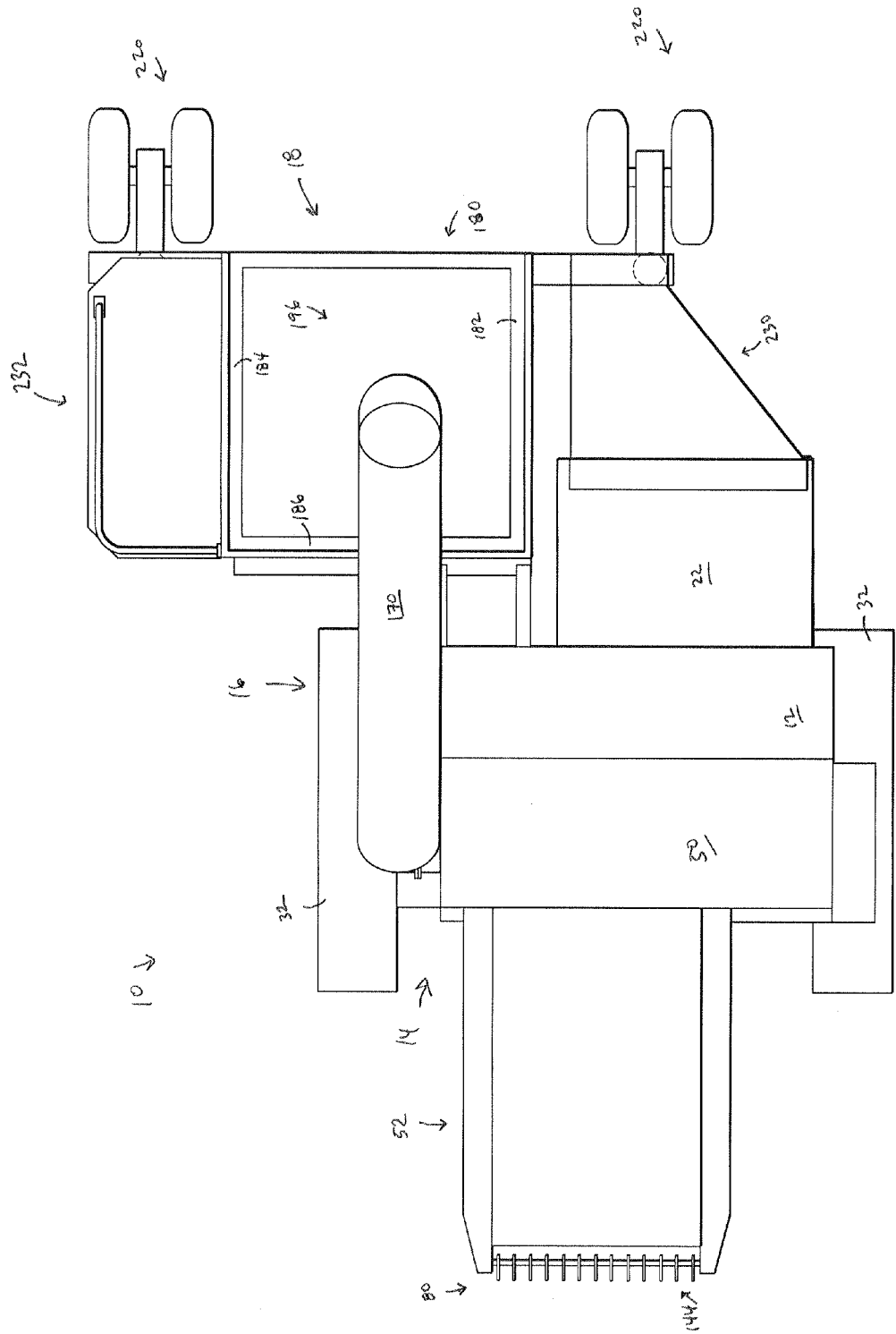
FIG. 12 is a top diagrammatic view of the infill extractor/collector shown in FIG. 1.

The infill collector 18 further includes wheel structures 220 for supporting the frame 180. In particular, the wheel structures 220 support an aft lower end of the frame 180 as the infill extractor/collector 10 moves along a field surface. The wheel structures 220 include arms 222 that are pivotally connected with the walls 182, 184. Wheels 224 are supported on the arms 222. The wheel structures 220 are pivotal relative to the frame 180 from an operative in use position to a stowed non-use position. The in use position of the wheel structures 220 is shown in FIG. 9, for example, and the stowed position is shown in FIG. 11D.

The infill collector 18 further includes outer gangways 230, 232 located outside the walls 182, 184, respectively. The outer gangways 230, 232 are adapted to support a user in a standing position while connecting a bag 202 to the frame 180 for the collection of extracted infill. For example, the outer gangways 230, 232 can include plates 234, 236. The plate 234 is removable and is supported by, and extends between, the operator platform 22 and the arm 222 of the wheel structure 220 associated with the wall 182. The plate 236 is hingedly coupled with a lower end of the wall 184, and may be supported by the arm 222 of the wheel structure 220 associated with the wall 184. A railing 238 is connected with the plate 236 and the wall 184 and can be grasped by a user stepping up onto the plate 236 of the gangway 232.

Referring next to FIGS. 1, 2, and 11A, the infill extractor/collector 10 further includes a canopy 240 located above the operator platform 22 and adapted to shelter a user standing on the operator platform 22. As shown in FIG. 11A, the canopy 240 is retractable, thereby to reduce the overall size of the infill extractor/collector 10. To that end, the canopy 240 includes a canopy cover 242 that is supported by a canopy support 244. The canopy support 244 includes a plurality of segments 246 operatively coupled together to allow the canopy support 244 to be adjusted between an erected in use position and a collapsed stowed position. The in use position is shown in FIGS. 1 and 2 and the stowed position is shown in FIG. 11A.

Figure 13:
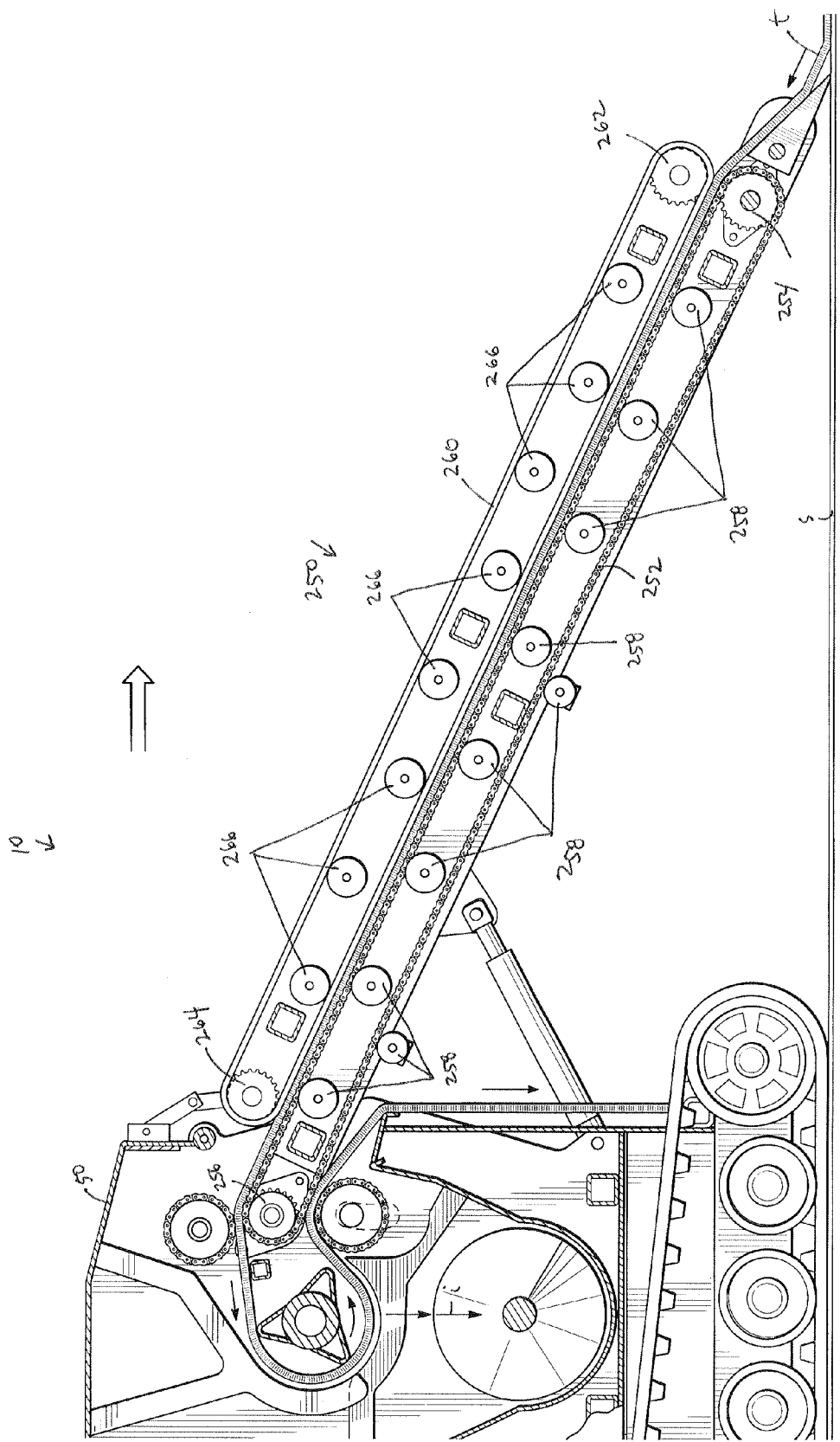
FIG. 13 is a partial cross sectional view, showing an alternative conveyor.

Referring next to FIG. 13, an alternative conveyor 250 is shown that can be used with the infill extractor/collector 10. The conveyor 250 includes a first, lower, endless belt 252 wrapped around main rollers 254, 256 and supported by intermediate rollers 258, some of which may be internal and some of which may be external to the belt 252. The conveyor 250 further includes a second, upper, endless belt 260 wrapped around main rollers 262, 264 and supported by intermediate rollers 266, some of which may be internal and some of which may be external to the belt 260. A strip of turf is sandwiched between the upper and lower belts 252, 260 as it is directed upwardly toward the housing 50. The belts 252, 260 may be synchronized so they move at substantially the same rate. Advantageously, the addition of the upper belt 260 contributes to the upward movement of the strip of turf on the conveyor 250 and acts somewhat as a brake to control the rate that the strip of turf from is pulled through the housing 50.

Advantageously, the infill extractor/collector 10 includes one or more magnets for attracting metallic articles, especially ferrous metals, which might be present in the turf. The one or more magnets separate the metallic articles from the infill and can be associated with any or all of the infill extractor 14, the infill mover 16, and the infill collector 18. As an example, magnets can be situated in the infill extractor 14, such as within the housing 50. As a further example, magnets can be situated in the infill mover 16, such as in the down chute 178. Preferably, the magnets are easy to access so that metallic articles collected thereon can be removed.

This specification shows and describes several preferred embodiments of the invention. However, those skilled in the art will appreciate that the disclosed embodiments are susceptible to a reasonable amount of modification and/or permutation, without departing from the overall scope of the invention. For instance, the dimensions of the components shown and described, and/or the relationships of those dimensions to other components may vary, as needed, in order to apply the general principles of the present invention to the actual circumstances at hand. Moreover, it is to be understood that the recitation of "objects of the invention" in this specification is not intended to be construed as an admission that others have recognized the same problems or perceived the same limitations in the state of the art, as recognized by the present inventors. Moreover, the recitation of the objects of the invention is also not intended to require each of the following claims to achieve all of the above-stated objects. Rather, the recitation of the objects of the invention in this specification is intended merely to help explain the story behind the present invention, and to explain why the present invention represents an advance in the state of the art over existing technology. Accordingly, the inventors intend that the scope of the appended claims are not to be limited by the specific details shown or described herein, or by the "objects" described above.

We claim:

1. An apparatus for extracting and collecting particulate infill from an infilled artificial turf field comprising:
    a vehicle having a first forward end and a second rearward end;
    an infill extractor located at the first end of the vehicle and adapted to extract infill from a strip of the infilled athletic turf field as the vehicle moves therealong, whereby the extracted infill falls into a bottom section of the infill extractor;
    an infill mover secured to the vehicle and adapted to move the extracted infill from the bottom section of the infill extractor toward the second end of the vehicle; and
    an infill collector connected to the second end of the vehicle and operable to cooperate with the infill mover to collect the moved infill, the infill collector further including a frame that is laterally movable relative to the vehicle from an operative "in use" position to a stowed position when not in use.

2. The apparatus of claim 1 wherein the frame of the infill collector further comprises:
    at least a pair of spaced walls and an upper support structure defining an infill collection station with an open bottom end;
    a plurality of retainers mounted on the upper support structure; and
    a lever operatively connected to the retainers, whereby actuation of the lever moves the retainers relative to the upper support structure between a bag retaining position and a bag release position.

3. The apparatus of claim 1 and further comprising:
    a rack mounted at an aft top end of the upper support structure and adapted to support bags to be filled with extracted infill.

4. The apparatus of claim 1 wherein the infill collector further comprises:
    a pair of outer gangways located outside of the walls, thereby to support a user in a stranding position while connecting a bag to the frame for collection of infill.

5. The apparatus of claim 1 further comprising:
    a pair of wheel structures supporting an aft end of the frame on opposite sides thereof, each of the wheel structures being pivotal relative to the frame, from an operative in-use position to a stowed non-use position.

6. The apparatus of claim 1, further comprising a mounting bracket extending from the vehicle and having a mounting bar, the frame having at least one mounting connector connected with the mounting bar, and wherein the vehicle defines a first forward facing direction, and the frame is pivotal relative to the vehicle about a horizontal axis that is perpendicular to the first forward facing direction of the vehicle.

7. The apparatus of claim 1 wherein the infill mover further comprises:
    enclosed auger; and
    a drive mechanism operative to directly drive the auger, thereby to move extracted infill from the bottom section of the infill extractor to the second end of the vehicle.

8. The apparatus of claim 1 and further comprising:
    an operator platform located behind the infill extractor and substantially adjacent to the infill mover and the infill collector, to enable an operator to operate the apparatus in a standing position on the operator platform.

9. The apparatus of claim 8 wherein the infill mover further comprises:
    an enclosed auger which extends at an angle rearwardly and upwardly from the bottom section of the infill extractor, the enclosed auger having an exit end located at about eye level for a user standing on the operator platform.

10. The apparatus of claim 9 wherein the vehicle further comprises a canopy located above the operator platform, wherein the canopy is retractable, thereby to reduce the overall size of the apparatus.

11. The apparatus of claim 1 and further comprising:
    a magnet associated within any of the infill extractor, infill mover, and the infill collector, the magnet adapted to attract metallic articles and separate the metallic articles from the infill.

12. An infill extractor for extracting infill from a strip of infilled artificial turf,
    a housing having an entrance and an exit and defining a path from the entrance to the exit for the strip to traverse therethrough, the entrance located generally above the exit at a first end of the housing;
    a conveyor located adjacent the entrance for directing the strip to the housing;
    a tension roller located adjacent the conveyor and adapted to cooperate with the conveyor to compress the strip as the strip moves into the housing;
    one single agitator located in the housing adjacent the path and operable to contact the strip as the strip moves along the path around the one single agitator for an arc of about 270 degrees, the one single agitator operable to separate infill from the strip; and
    a pulling roller located below the conveyor and adapted to cooperate with the conveyor to pull the strip along the path and then out of the exit of the housing.

13. The infill extractor of claim 12 wherein the housing further comprises:
    structural members which partially circumscribe the one single agitator to define a portion of the path.

14. The infill extractor of claim 12 and further comprising:
    the one single agitator having a generally triangular shape in transverse cross section, with a plurality of vertically oriented openings; and
    a plurality of strippers mounted in the housing along the path, each of the strippers adapted to interact with one of the vertically oriented openings of the one single agitator, whereby the strippers direct the strip away from the one single agitator and toward the exit.

15. The infill extractor of claim 12 and further comprising:
    a motorized vehicle to which the infill extractor is mounted.

16. The infill extractor of claim 12 wherein the tension roller, the conveyor, and the pulling roller are substantially aligned vertically.

17. An infill extractor for extracting infill from a strip of infilled artificial turf located on the ground at a field site, comprising:
    a vehicle;
    a housing mounted at a first end of the vehicle, the housing having an entrance adjacent a top of the first end of the housing and an exit located below the entrance at the first end of the housing, the housing defining a path between the entrance and the exit;
    a conveyor supported by the vehicle at the first end thereof and adapted to direct a strip of infilled artificial turf from the ground to the entrance of the housing, the conveyor further including a first forward end and a second aft end located adjacent the entrance;
    a plurality of spaced fingers mounted at the first forward end of the conveyor, thereby to facilitate the upward directing of the strip.

18. The infill extractor of claim 17 wherein the conveyor further comprises a first endless belt which is supported internally along the length thereof by a plurality of spaced rollers.

19. The infill extractor of claim 18 wherein the conveyor further comprises a second endless belt which is supported internally along the length thereof by a plurality of spaced rollers, and wherein the first and second endless belts are adapted to sandwich the strip therebetween.

20. The infill extractor of claim 17 and further comprising:
    a like number of pawls located at the first forward end of the conveyor, with each pawl associated with one of the fingers, the pawls adapted to engage and manipulate the strip on the ground.

* * * * *